(12) United States Patent
Kim et al.

(10) Patent No.: US 12,348,710 B2
(45) Date of Patent: *Jul. 1, 2025

(54) METHOD AND DEVICE FOR DERIVING INTRA-PREDICTION MODE

(71) Applicant: SK TELECOM CO., LTD., Seoul (KR)

(72) Inventors: Jae Il Kim, Seoul (KR); Sun Young Lee, Seoul (KR); Kyung Hwan Ko, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,526

(22) Filed: Apr. 23, 2024

(65) Prior Publication Data

US 2024/0283911 A1    Aug. 22, 2024

Related U.S. Application Data

(63) Continuation of application No. 17/614,500, filed as application No. PCT/KR2020/006823 on May 27, 2020, now Pat. No. 11,991,350.

(30) Foreign Application Priority Data

May 27, 2019  (KR) .................. 10-2019-0061737
Dec. 2, 2019  (KR) .................. 10-2019-0157997

(51) Int. Cl.
*H04N 19/105* (2014.01)
*H04N 19/11* (2014.01)
(Continued)

(52) U.S. Cl.
CPC .......... *H04N 19/105* (2014.11); *H04N 19/11* (2014.11); *H04N 19/159* (2014.11); *H04N 19/176* (2014.11)

(58) Field of Classification Search
None
See application file for complete search history.

(56) References Cited

U.S. PATENT DOCUMENTS 11,706,405 B2 *  7/2023  Heo .................. H04N 19/46
                                              375/240.02
11,722,681 B2     8/2023  Zhao et al.
(Continued)

FOREIGN PATENT DOCUMENTS

AU      2020245002 B2      3/2023
KR    10-2013-0100662 A    9/2013
(Continued)

OTHER PUBLICATIONS

International Search Report issued on Aug. 24, 2020, for corresponding International Patent Application No. PCT/KR2020/006823.

(Continued)

*Primary Examiner* — Jessica M Prince
(74) *Attorney, Agent, or Firm* — Hauptman Ham, LLP

(57) ABSTRACT

A method and apparatus for deriving an intra-prediction mode are disclosed. At least one embodiment of the present disclosure provides a method of deriving an intra-prediction mode, including (i) obtaining, based on reference line information indicating any one of a plurality of reference lines, most probable mode (MPM) information indicating whether an intra-prediction mode of a current block is included in an MPM list lacking a planar mode, (ii) determining, based on the reference line information and the MPM information, planar information indicating whether the intra-prediction mode of the current block is the planar mode, and (iii) deriving the intra-prediction mode of the current block by using the planar information.

10 Claims, 14 Drawing Sheets

(51) Int. Cl.
  *H04N 19/159*  (2014.01)
  *H04N 19/176*  (2014.01)

(56) References Cited

U.S. PATENT DOCUMENTS

| | | |
|---|---|---|
| 2013/0089144 A1 | 4/2013 | Lee |
| 2014/0233644 A1 | 8/2014 | Lee |
| 2018/0184082 A1 | 6/2018 | Yoo et al. |
| 2019/0238840 A1 | 8/2019 | Jang |
| 2019/0238841 A1 | 8/2019 | Lee et al. |
| 2019/0273919 A1 | 9/2019 | Lim et al. |
| 2020/0162729 A1 | 5/2020 | Lee et al. |
| 2020/0260114 A1* | 8/2020 | Zhao .................... H04N 19/176 |
| 2021/0274165 A1 | 9/2021 | Li et al. |
| 2021/0344907 A1 | 11/2021 | Heo et al. |
| 2021/0360231 A1 | 11/2021 | Heo et al. |
| 2022/0078449 A1 | 3/2022 | Salehifar et al. |
| 2022/0086426 A1 | 3/2022 | Lee et al. |
| 2022/0109846 A1 | 4/2022 | Lim et al. |
| 2022/0150537 A1 | 5/2022 | Heo et al. |
| 2022/0174270 A1 | 6/2022 | Li et al. |
| 2022/0329789 A1 | 10/2022 | Heo et al. |
| 2022/0360800 A1 | 11/2022 | Xu |
| 2023/0209078 A1 | 6/2023 | Paluri et al. |
| 2023/0251500 A1 | 8/2023 | Li et al. |
| 2023/0308636 A1* | 9/2023 | Li ...................... H04N 19/176 |

FOREIGN PATENT DOCUMENTS

| | | |
|---|---|---|
| KR | 10-2018-0046876 A | 5/2018 |
| KR | 10-2019-0013611 A | 2/2019 |
| KR | 10-2019-0042732 A | 4/2019 |
| WO | 2018/074812 A1 | 4/2018 |
| WO | 2020/040439 A1 | 2/2020 |
| WO | 2020/197203 A1 | 10/2020 |
| WO | 2020/251329 A1 | 12/2020 |
| WO | 2020/251330 A1 | 12/2020 |
| WO | 2020/256525 A1 | 12/2020 |

OTHER PUBLICATIONS

Written Opinion issued on Aug. 24, 2020, for corresponding International Patent Application No. PCT/KR2020/006823.

M. Jiang, S. Li, N. Ling, J. Zheng and P. Zhang, "On Derivation of Most Probable Modes for Intra Prediction in Video Coding", 2018 IEEE International Symposium on Circuits and Systems (ISCAS), Florence, Italy, 2018, pp. 1-4, doi: 10.1109/ISCAS.2018.8351605. (Year:2018).

Li (marked up U.S. Appl. No. 62/822,874, filed Mar. 23, 2019 conrresponding to Li (U.S. Appl. No. 62/822,874, filed Mar. 23, 2019A1). (Year: 2019).

* cited by examiner (A)

(B)

METHOD AND DEVICE FOR DERIVING INTRA-PREDICTION MODE

CROSS-REFERENCE TO RELATED APPLICATION

This present application is a continuation of U.S. patent application Ser. No. 17/614,500, filed on Nov. 26, 2021, which is a national phase of PCT/KR2020/006823, filed on May 27, 2020, which is based on and claims priority to Korean Patent Application No. 10-2019-0157997, filed on Dec. 2, 2019, and Korean Patent Application No. 10-2019-0061737, filed on May 27, 2019, the disclosures of which are incorporated by reference herein in their entireties.

TECHNICAL FIELD

The present disclosure in some embodiments relates to the encoding and decoding of images or a video. More particularly, the present disclosure relates to a method and apparatus for deriving an intra-prediction mode through an intra-prediction mode derivation scheme having an extended application range to provide improved encoding and decoding efficiency.

BACKGROUND

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoder can receive, decompress, and reproduce the compressed video data. Existing video compression technologies include H.264/AVC and High Efficiency Video Coding (HEVC), which improves the encoding efficiency of H.264/AVC by about 40%.

However, the constant increase of videos in size, resolution, and frame rate and the resultant increase of data amount to be encoded require a new and superior compression technique with better coding efficiency and higher image quality improvement over existing compression techniques.

SUMMARY

Technical Problem

The present disclosure seeks to provide an improved video encoding and decoding technology to meet these needs, and in particular, at least one aspect of the present disclosure is to provide techniques for improving the efficiency of video encoding and decoding through an intra-prediction mode derivation scheme that is generally applicable to various intra prediction techniques.

Technical Solution

At least one aspect of the present disclosure provides a method of deriving an intra-prediction mode, including obtaining, based on reference line information indicating any one of a plurality of reference lines, most probable mode (MPM) information indicating whether an intra-prediction mode of a current block is included in an MPM list lacking a planar mode, determining, based on the reference line information and the MPM information, planar information indicating whether the intra-prediction mode of the current block is the planar mode, and deriving the intra-prediction mode of the current block by using the planar information.

Another aspect of the present disclosure provides an apparatus for decoding video images, including an acquisition unit, a determination unit, and a derivation unit. The acquisition unit is configured to obtain, based on reference line information indicating any one of a plurality of reference lines, most probable mode (MPM) information indicating whether an intra-prediction mode of a current block is included in an MPM list lacking a planar mode. The determination unit is configured to determine, based on the reference line information and the MPM information, planar information indicating whether the intra-prediction mode of the current block is the planar mode. The derivation unit is configured to derive the intra-prediction mode of the current block by using the planar information.

Advantageous Effects

As described above, according to at least one embodiment of the present disclosure, an intra-prediction mode derivation scheme is provided with a more extended application range an efficient selection of candidate intra modes for a chroma block and more precise prediction of the chroma block can result in improved compression performance.

According to another embodiment of the present disclosure, an MPM list and a non-MPM list can be efficiently set, thereby providing an improved compression performance.

DETAILED DESCRIPTION

Figure 1:
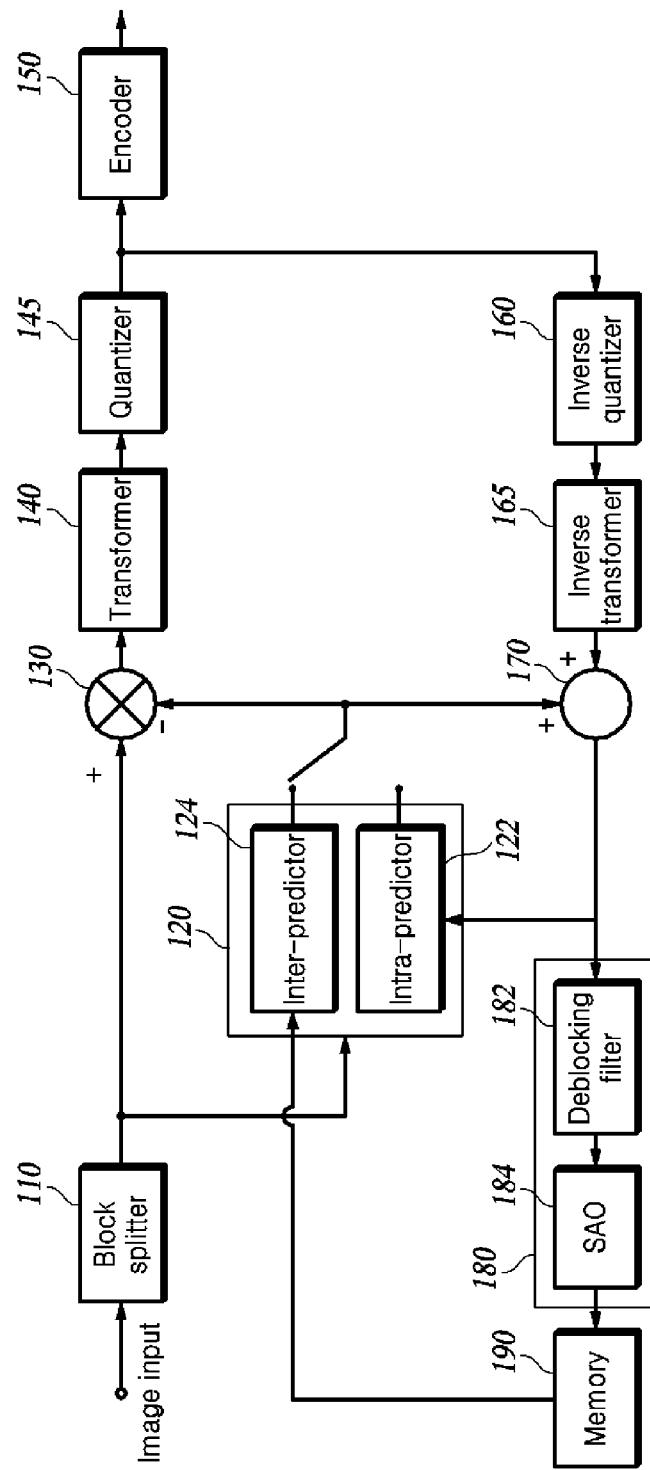
FIG. 1 is a block diagram illustrating a video encoding apparatus that can implement the techniques of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

FIG. 1 is a block diagram illustrating a video encoding apparatus that can implement the techniques of the present disclosure. Hereinafter, a video encoding apparatus and sub-components of the apparatus will be described with reference to FIG. 1.

The video encoding apparatus may be configured including a block splitter 110, a prediction unit 120, a subtractor 130, a transformer 140, a quantizer 145, an encoder 150, an inverse quantizer 160, an inverse transformer 165, an adder 170, a filter unit 180, and a memory 190.

The respective components of the video encoding apparatus may be implemented as hardware or software, or hardware and software combined. Additionally, the function of each component may be implemented by software and the function by software for each component may be implemented to be executed by a microprocessor.

A video is composed of a plurality of pictures. The pictures are each split into a plurality of regions, and encoding is performed for each region. For example, one picture is split into one or more tiles or/and slices. Here, one or more tiles may be defined as a tile group. Each tile or/and slice is split into one or more Coding Tree Units (CTUs). And each CTU is split into one or more Coding Units (CUs) by a tree structure. Information applied to the respective CUs are encoded as syntaxes of the CUs, and information commonly applied to CUs included in one CTU is encoded as a syntax of the CTU. Additionally, information commonly applied to all blocks in one slice is encoded as a syntax of a tile or as a syntax of a tile group that is a collection of tiles, and information applied to all blocks constituting one picture is encoded in a Picture Parameter Set (PPS) or a picture header. Furthermore, information commonly referenced by a plurality of pictures is encoded in a Sequence Parameter Set (SPS). Additionally, information commonly referenced by one or more SPSs is encoded in a Video Parameter Set (VPS).

The block splitter 110 determines the size of the coding tree unit (CTU). Information on the size of the CTU (CTU size) is encoded as a syntax of the SPS or PPS and transmitted to a video decoding apparatus.

The block splitter 110 splits each picture constituting the video into a plurality of coding tree units (CTUs) having a predetermined size and then uses a tree structure to split the CTUs recursively. A leaf node in the tree structure becomes a coding unit (CU), which is a basic unit of encoding.

A tree structure for use may be a QuadTree (QT) in which an upper node (or parent node) is split into four equally sized lower nodes (or child nodes), a BinaryTree (BT) in which an upper node is split into two lower nodes, a TernaryTree (TT) in which an upper node is split into three lower nodes in a size ratio of 1:2:1, or a mixture of two or more of the QT structure, BT structure, and TT structure. For example, a QuadTree plus BinaryTree (QTBT) structure may be used, or a QuadTree plus BinaryTree TernaryTree (QTBTTT) structure may be used. Here, BTTT may be collectively referred to as a Multiple-Type Tree (MTT).

Figure 2:
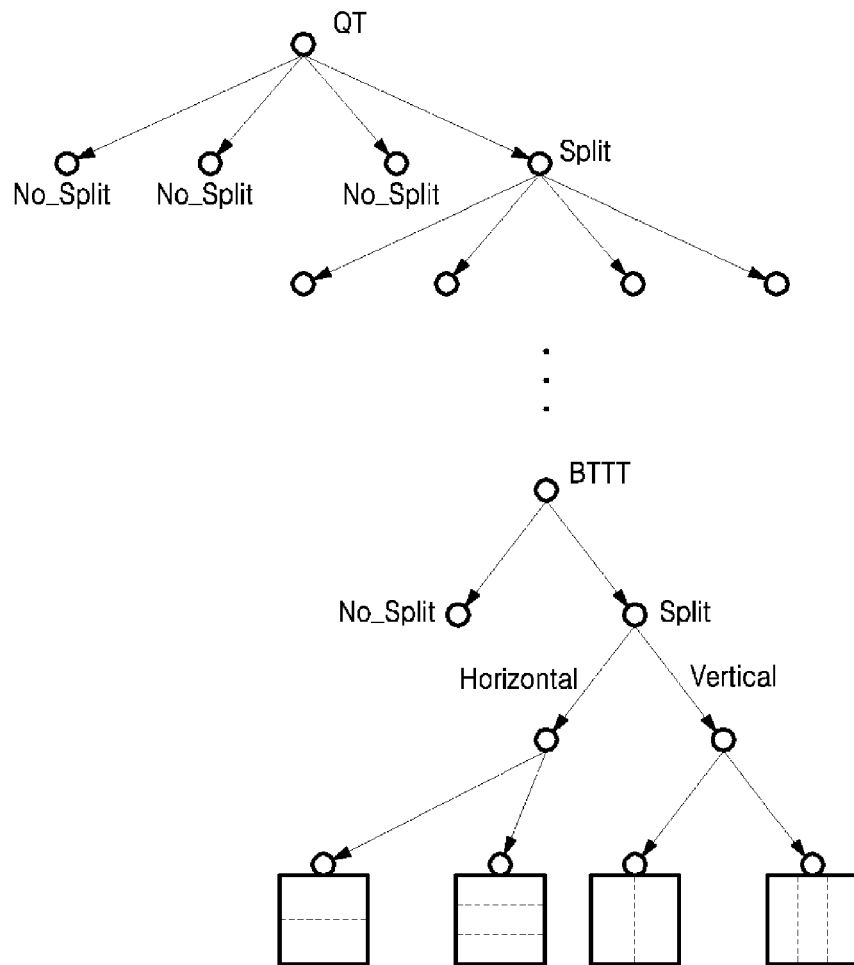
FIG. 2 is a diagram for explaining a method of partitioning or splitting a block by using a QTBTTT structure.

FIG. 2 shows a QTBTTT split tree structure. As shown in FIG. 2, the CTU may be first split into a QT structure. The quadtree splitting may be repeated until the size of a splitting block reaches the minimum block size (MinQTSize) of a leaf node allowed in QT. A first flag (QT_split_flag) indicating whether each node of the QT structure is split into four nodes of a lower layer is encoded by the encoder 150 and signaled to the video decoding apparatus. When the leaf node of the QT is not larger than the maximum block size (MaxBTSize) of the root node allowed in the BT, it may be further split into any one or more of the BT structure or the TT structure. In the BT structure and/or the TT structure, there may be a plurality of split directions. For example, there may be two directions in which the block of the relevant node is split horizontally and vertically. As shown in FIG. 2, when MTT splitting starts, a second flag (mtt_split_flag) indicating whether the nodes are split, and if yes, a further flag indicating split directions (vertical or horizontal) and/or a flag indicating partition or split type (binary or ternary) are encoded by the encoder 150 and signaled to the video decoding apparatus.

As another example of the tree structure, when a block is split using the QTBTTT structure, information on a CU split flag (split_cu_flag) indicating that the node was split is first encoded and signaled and then a QT split flag (split_qt_flag) information indicating whether the split type is QT split is encoded by the encoder 150 and signaled to the video decoding apparatus. When the CU split flag (split_cu_flag) value indicates that the node was not split, the block of that node becomes a leaf node in the split tree structure and turns into a coding unit (CU), which is a basic unit of coding. When the CU split flag (split_cu_flag) value indicates that the node was split, the video encoding apparatus classifies the split type into QT split or MTT split. When the split type is QT split, there is no additional information. When the split type is MTT split, one or both of flags are additionally encoded and signaled by the encoder 150 and signaled to the video decoding apparatus, which are a flag (mtt_split_cu_vertical_flag) indicating the MTT split direction (vertical or horizontal) and a flag (mtt_split_cu_binary_flag) indicating the MTT split type (binary or ternary).

As yet another example of the tree structure, when QTBT is used, there may be two types of partition including a type that horizontally splits the block of the relevant node into two equally sized blocks (i.e., symmetric horizontal splitting) and a type that splits the same vertically (i.e., symmetric vertical splitting). Encoded by the encoder 150 and transmitted to the video decoding apparatus are a split flag (split_flag) indicating whether each node of the BT structure is split into blocks of a lower layer and partition type information indicating its partition type. Meanwhile, there may be a further type in which the block of the relevant node is split into two asymmetrically formed blocks. The asymmetric form may include a form of the block of the relevant node being split into two rectangular blocks having a size ratio of 1:3 or a form of the block of the relevant node being split in a diagonal direction.

A CU may have various sizes depending on the QTBT or QTBTTT split of the CTU. Hereinafter, a block corresponding to a CU to be encoded or decoded (i.e., a leaf node of QTBTTT) is referred to as a 'current block'.

The prediction unit 120 predicts the current block to generate a prediction block. The prediction unit 120 includes an intra predictor 122 and an inter predictor 124.

In general, the current blocks in a picture may each be predictively coded. Prediction of the current block may be generally performed using an intra prediction technique or inter prediction technique. The intra prediction technique uses data from a picture containing the current block and the inter prediction technique uses data from the preceding picture coded before the picture containing the current block. Inter prediction includes both unidirectional prediction and bidirectional prediction.

Figure 3:
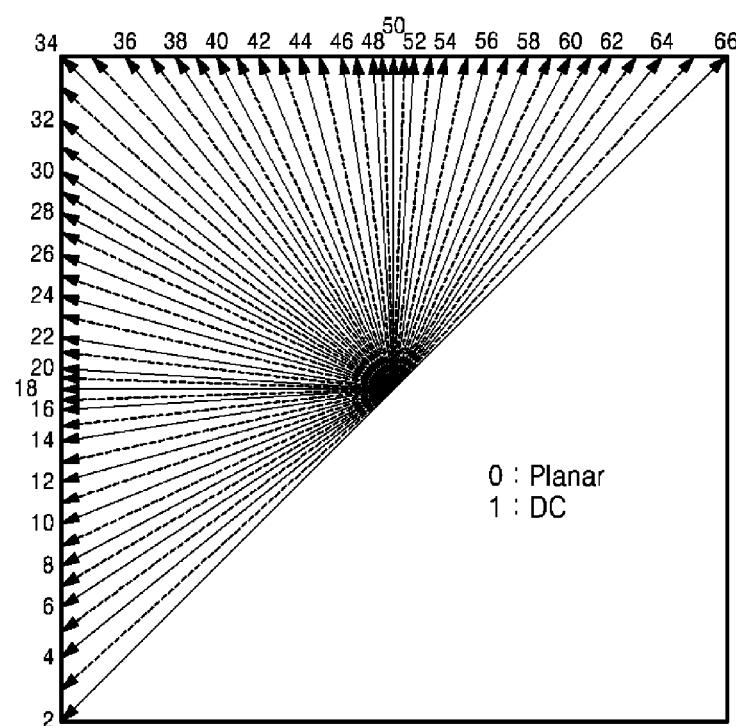
FIG. 3 is a diagram of multiple intra prediction modes.

The intra predictor 122 predicts pixels in the current block by using the peripheral pixels (reference pixels) located around the current block in the current picture. There are multiple intra prediction modes depending on different prediction directions. For example, as shown in FIG. 3, the multiple intra prediction modes may include 2 non-directional modes including a planar mode and a DC mode and 65 directional modes. Neighboring pixels and an equation to be used are defined differently for each prediction mode.

The intra predictor 122 may determine an intra prediction mode to be used for encoding the current block. In some examples, the intra predictor 122 may encode the current block by using several intra prediction modes and select an appropriate intra prediction mode to use from tested modes. For example, the intra predictor 122 may calculate rate-distortion values through rate-distortion analysis of several tested intra prediction modes and select an intra prediction mode that has the best rate-distortion characteristics among the tested modes.

The intra predictor 122 selects one intra prediction mode from among a plurality of intra prediction modes and predicts the current block by using at least one neighboring pixel (reference pixel) determined according to the selected intra prediction mode and calculation formula. Information on the selected intra prediction mode is encoded by the encoder 150 and transmitted to the video decoding apparatus.

The inter predictor 124 generates a prediction block for the current block through a motion compensation process. The inter predictor 124 searches for a block most similar to the current block in the coded and decoded reference picture before the current picture, and generates a prediction block of the current block by using the searched block. Then, the inter predictor 124 generates a motion vector corresponding to the displacement between the current block in the current picture and the prediction block in a reference picture. In general, motion estimation is performed on a luma component, and a motion vector calculated based on the luma component is used for both the luma component and the chroma component. Motion information including information on the reference picture and information on the motion vector used to predict the current block is encoded by the encoder 150 and transmitted to the video decoding apparatus.

The subtractor 130 generates a residual block by subtracting, from the current block, the prediction block generated by the intra predictor 122 or the inter predictor 124.

The transformer 140 transforms the residual signal in the residual block having pixel values in the spatial domain into transform coefficients in the frequency domain. The transformer 140 may transform the residual signals in the residual block by using the residual block in full size as a transform unit, or separate the residual block into two subblocks, which are a transform region and a non-transform region, and use only the transform-region subblock as a transform unit to transform the residual signals. Here, the transform-region subblock may be one of two rectangular blocks having a size ratio of 1:1 based on the horizontal axis (or vertical axis). In this case, the flag (cu_sbt_flag) indicating that only the subblock is transformed, directional or vertical/horizontal information (cu_sbt_horizontal_flag), and/or position information (cu_sbt_pos_flag) are encoded by the encoder 150 and signaled to the video decoding apparatus. Additionally, the size of the transform-region subblock may have a size ratio of 1:3 based on the horizontal axis (or vertical axis), wherein the flag (cu_sbt_quad_flag) identifying that partition is additionally encoded by the encoder 150 and signaled to the video decoding apparatus.

The quantizer 145 quantizes the transform coefficients outputted from the transformer 140 and outputs the quantized transform coefficients to the encoder 150.

The encoder 150 uses various encoding methods such as Context-based Adaptive Binary Arithmetic Code (CABAC) and the like for encoding the quantized transform coefficients to generate a bitstream. The encoder 150 encodes information on block partition, such as CTU size, CU split flag, QT split flag, MTT split type, and MTT split direction related to the block partition for allowing the video decoding apparatus to split the block in the same way as the video encoding apparatus does.

Additionally, the encoder 150 encodes information on a prediction type indicating whether the current block is encoded by intra prediction or inter prediction and encodes, depending on the prediction type, intra prediction information (i.e., information on intra prediction mode) or inter prediction information (i.e., information on reference pictures and motion vectors).

The inverse quantizer 160 inverse quantizes the quantized transform coefficients outputted from the quantizer 145 to generate transform coefficients. The inverse transformer 165 transforms the transform coefficients outputted from the inverse quantizer 160 from the frequency domain to the spatial domain to reconstruct the residual block.

The adder 170 adds up the reconstructed residual block and the prediction block generated by the prediction unit 120 to reconstruct the current block. Pixels in the reconstructed current block are used as reference pixels when intra-predicting the next block.

The filter unit 180 performs filtering on the reconstructed pixels to reduce blocking artifacts, ringing artifacts, blurring artifacts, etc. generated due to block-based prediction and transform/quantization. The filter unit 180 may include a deblocking filter 182 and a sample adaptive offset (SAO) filter 184.

The deblocking filter 180 filters the boundary between the reconstructed blocks to remove a blocking artifact caused by block-by-block encoding/decoding, and the SAO filter 184 performs additional filtering on the deblocking filtered video. The SAO filter 184 is a filter used to compensate for a difference between a reconstructed pixel and an original pixel caused by lossy coding.

The reconstructed block is filtered through the deblocking filter 182 and the SAO filter 184 and stored in the memory 190. When all blocks in one picture are reconstructed, the reconstructed picture may be used as a reference picture for inter-prediction of blocks in the next picture to be encoded.

Figure 4:
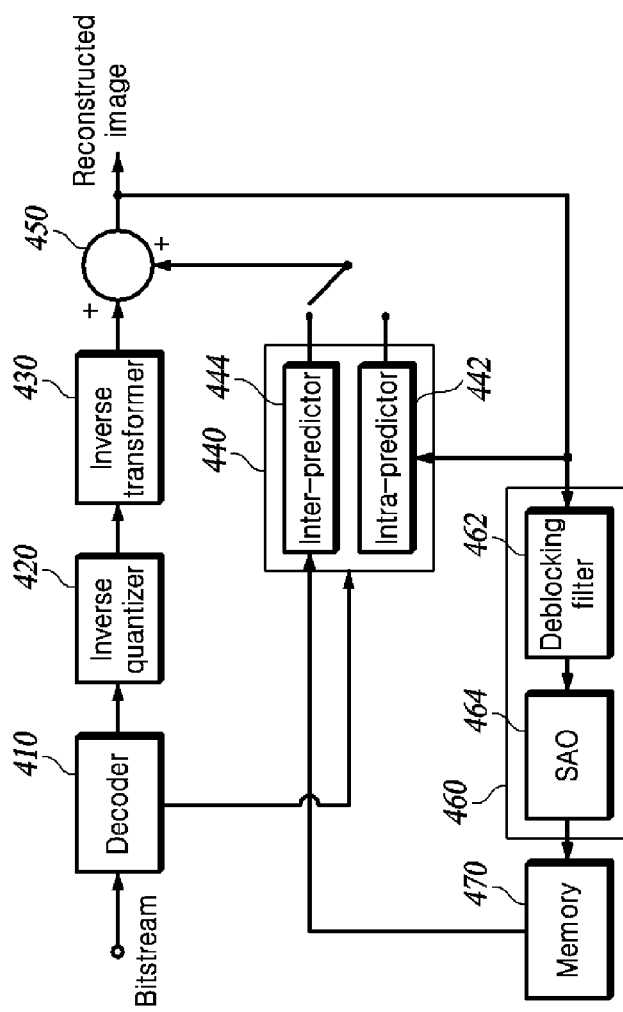
FIG. 4 is a block diagram illustrating a video decoding apparatus capable of implementing the techniques of the present disclosure.

FIG. 4 is a functional block diagram illustrating a video decoding apparatus capable of implementing the techniques of the present disclosure. Hereinafter, the video decoding apparatus and sub-components of the apparatus will be described referring to FIG. 4.

The video decoding apparatus may be configured including a decoder 410, an inverse quantizer 420, an inverse transformer 430, a prediction unit 440, an adder 450, a filter unit 460, and a memory 470.

As with the video encoding apparatus of FIG. 1, the respective components of the video decoding apparatus may be implemented as hardware or software, or hardware and software combined. Additionally, the function of each component may be implemented by software and the function by software for each component may be implemented to be executed by a microprocessor.

The decoder 410 decodes the bitstream generated by the video encoding apparatus and extracts information on block partition to determine the current block to be decoded, and extracts prediction information required to reconstruct the current block and information on residual signal, etc.

The decoder 410 extracts information on the CTU size from a sequence parameter set (SPS) or a picture parameter set (PPS), determines the size of the CTU, and splits the picture into CTUs of the determined size. Then, the decoder 410 determines the CTU as the highest layer, i.e., the root node of the tree structure, and extracts the split information on the CTU, and thereby splits the CTU by using the tree structure.

For example, when splitting the CTU by using the QTBTTT structure, a first flag (QT_split_flag) related to QT splitting is first extracted and each node is split into four nodes of a lower layer. For the node corresponding to the leaf node of QT, the decoder 410 extracts the second flag (MTT_split_flag) related to the partition of MTT and information of the split direction (vertical/horizontal) and/or split type (binary/ternary) to split that leaf node into an MTT structure. This allows the respective nodes below the leaf node of QT to be recursively split into a BT or TT structure.

As another example, when splitting the CTU by using the QTBTTT structure, the decoder 410 first extracts a CU split flag (split_cu_flag) indicating whether a CU is split, and upon splitting the relevant block, it extracts QT split flag (split_qt_flag). When the partition type is MTT, not QT, the decoder 410 further extracts the flag (mtt_split_cu_vertical_flag) indicating the MTT split direction (vertical or horizontal) and/or the flag (mtt_split_cu_binary_flag) indicating the MTT split type (binary or ternary). In the splitting process, each node may have zero or more recursive QT splits followed by zero or more recursive MTT splits. For example, the CTU may immediately enter MTT split, or conversely, have multiple QT splits alone.

As yet another example, when splitting the CTU by using the QTBT structure, the decoder 410 extracts a first flag (QT_split_flag) related to QT splitting to split each node into four nodes of a lower layer. And, for a node corresponding to a leaf node of QT, the decoder 410 extracts a split flag (split_flag) indicating whether that node is or is not further split into BT and split direction information.

Meanwhile, when the decoder 410 determines the current block to be decoded through the tree-structure splitting, it extracts information on a prediction type indicating whether the current block was intra-predicted or inter-predicted. When the prediction type information indicates intra prediction, the decoder 410 extracts a syntax element for intra prediction information (intra prediction mode) of the current block. When the prediction type information indicates inter prediction, the decoder 410 extracts a syntax element for the inter prediction information, that is, information indicating a motion vector and a reference picture referenced by the motion vector.

Meanwhile, the decoder 410 extracts information on the quantized transform coefficients of the current block as information on the residual signal.

The inverse quantizer 420 inverse quantizes the quantized transform coefficients. The inverse transformer 430 inverse transforms the inverse quantized transform coefficients from the frequency domain to the spatial domain to reconstruct the residual signals and thereby generates a reconstructed residual block of the current block.

Additionally, when the inverse transformer 430 inversely transforms only a partial region (subblock) of the transform block, it extracts a flag (cu_sbt_flag) indicating that only the subblock of the transform block has been transformed, the subblock's directional (vertical/horizontal) information (cu_sbt_horizontal_flag), and/or subblock's position information (cu_sbt_pos_flag), and inversely transforms the transform coefficients of that subblock from the frequency domain to the spatial domain to reconstruct the residual signals. At the same time, the inverse transformer 430 fills the remaining region of the transform block left untransformed inversely with the "0" value for the residual signals and thereby generates the final residual block for the current block.

The prediction unit 440 may include an intra predictor 442 and an inter predictor 444. The intra predictor 442 is activated when the prediction type of the current block is intra prediction, and the inter predictor 444 is activated when the prediction type of the current block is inter prediction.

The intra predictor 442 determines, among a plurality of intra prediction modes, the intra prediction mode of the current block from the syntax element for the intra prediction mode extracted by the decoder 410, and according to the determined intra prediction mode, it predicts the current block by using neighboring reference pixels of the current block.

The inter predictor 444 utilizes the syntax element for the inter prediction information extracted by the decoder 410 to determine a motion vector of the current block and a reference picture referenced by the motion vector, and it predicts the current block by using the motion vector and the reference picture as determined.

The adder 450 adds up the residual block outputted from the inverse transformer and the prediction block outputted from the inter predictor or the intra predictor to reconstruct the current block. Pixels in the reconstructed current block are used as reference pixels when intra-predicting a coming block to be decoded.

The filter unit 460 may include a deblocking filter 462 and an SAO filter 464. The deblocking filter 462 deblocks and filters the boundary between reconstructed blocks to remove a blocking artifact caused by block-by-block decoding. The SAO filter 464 performs additional filtering on the reconstructed block after deblocking filtering to compensate for the difference between the reconstructed pixel and the original pixel caused by lossy coding. The reconstructed block is filtered through the deblocking filter 462 and the SAO filter 464 and stored in the memory 470. When all blocks in one picture are reconstructed, the reconstructed picture is used as a reference picture for inter-prediction of blocks in a picture to be encoded thereafter.

Figure 5:
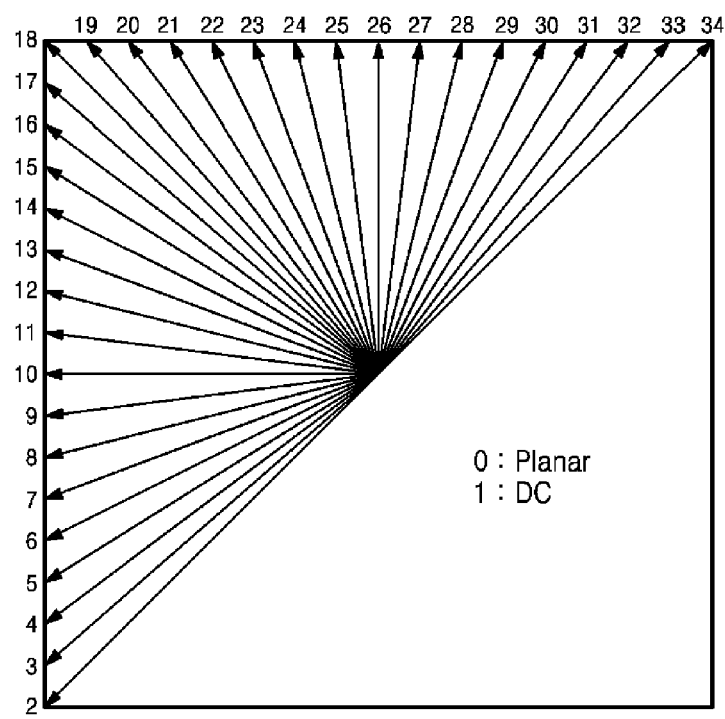
FIG. 5 is a diagram illustrating conventional intra prediction modes.

The intra prediction modes for intra prediction are composed of directional modes with directionality and non-directional modes without directionality. In the conventional method, as shown in FIG. 5, intra prediction is performed using a total of 35 intra prediction modes including 33 angular modes with directionality, i.e., directional modes and two non-angular modes without directionality, i.e., non-directional modes of a planar mode and a direct current (DC) mode.

The conventional method determines an intra prediction mode used for intra prediction of the current block (or an intra prediction mode of the current block) by selecting the three most probable modes (MPMs) with a high probability of matching the intra prediction mode of the current block among the 35 modes and configuring a list by including the selected prediction modes. For the list configuration, the conventional method uses the prediction modes of the neighboring blocks located in the vicinity of the current block and the prediction modes that are statistically most frequently used.

A list consisting of selected prediction modes may be referred to as an MPM list, and unselected prediction modes, i.e., 32 prediction modes may be referred to as non-MPM modes or remaining modes. Additionally, a list consisting of non-MPM modes may be referred to as a non-MPM list.

The intra prediction mode of the current block may be determined by prediction mode information items signaled from the video encoding apparatus to the video decoding apparatus or video decoding apparatus. Conventionally, a 1-bit flag is signaled first indicating whether the intra prediction mode of the current block is included in the MPM list. If the intra prediction mode of the current block is included in the MPM list, information (MPM index) is signaled to indicate any one of the prediction modes included in the MPM list. If the intra prediction mode of the current block is not included in the MPM list, an index indicating any one of the non-MPM modes is signaled.

Meanwhile, intra prediction of the current block may utilize various techniques such as multiple reference lines (MRL), intra sub-partition (ISP), regular intra prediction, etc.

Figure 6:
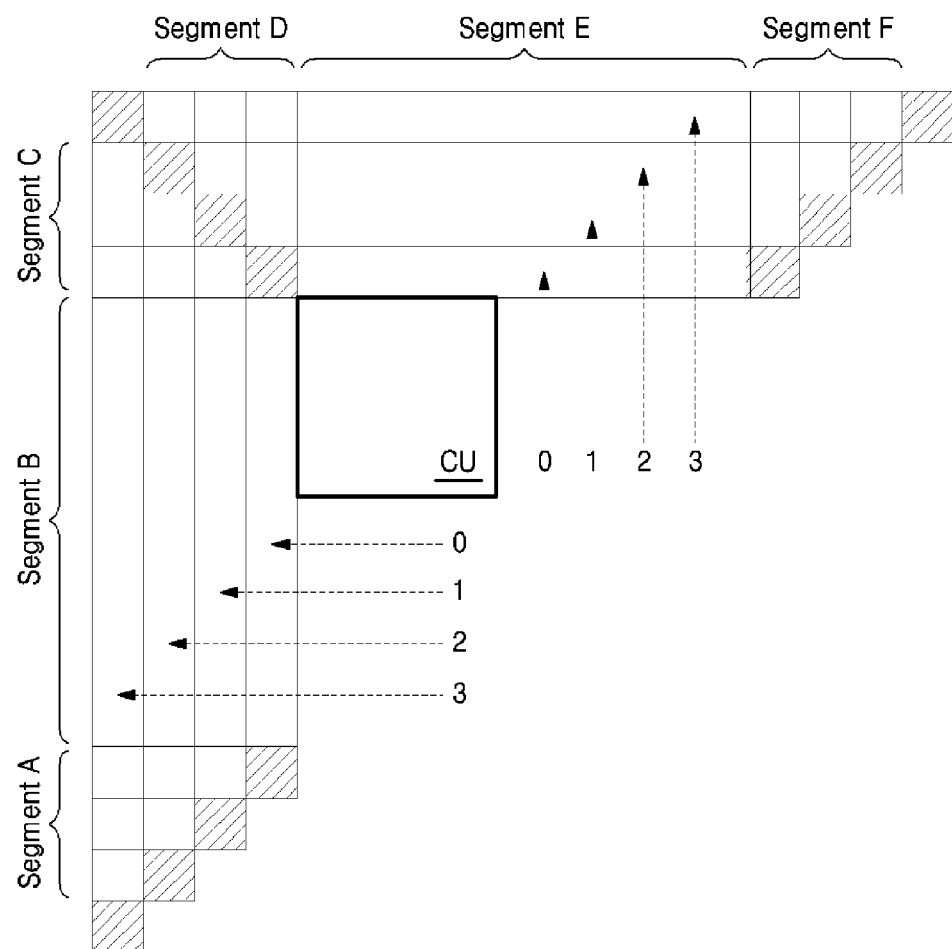
FIG. 6 is a diagram illustrating a multiple reference lines (MRL) function.

As illustrated in FIG. 6, the MRL technique or MRL mode refers to a technique for performing intra prediction of a current block (CU) by using multiple reference lines. When the MRL mode is applied, the multiple reference lines are assigned indexes of "0" to "3" according to the degree of proximity to the current block. One reference line is selected from among reference lines of "0," "1," and "2," and samples in the selected reference line are used as reference samples when performing the intra prediction. Information (index) on the selected reference line is signaled from the video encoding apparatus to the video decoding apparatus. The MRL mode is applicable only to the MPM modes and applies only to the directional modes and the DC mode.

Figure 7:
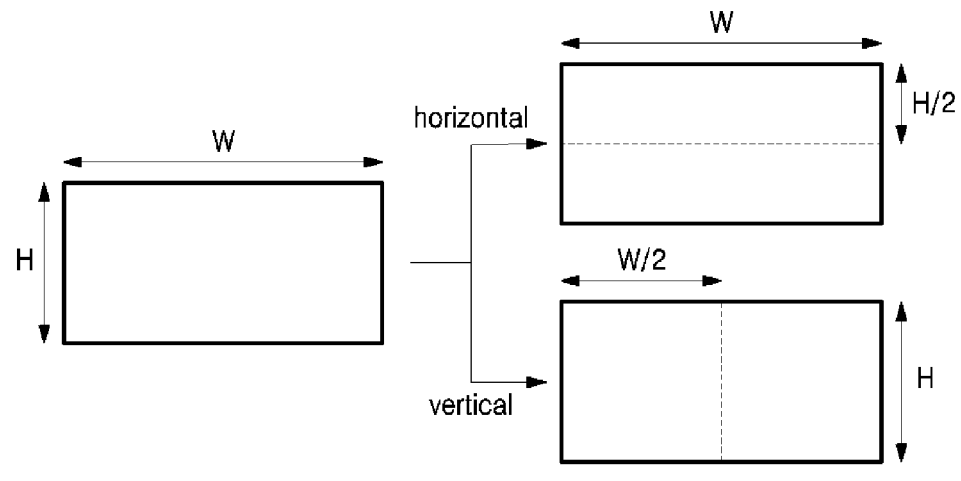
FIG. 7 is a diagram illustrating an intra sub-partition (ISP) function.
Figure 7:
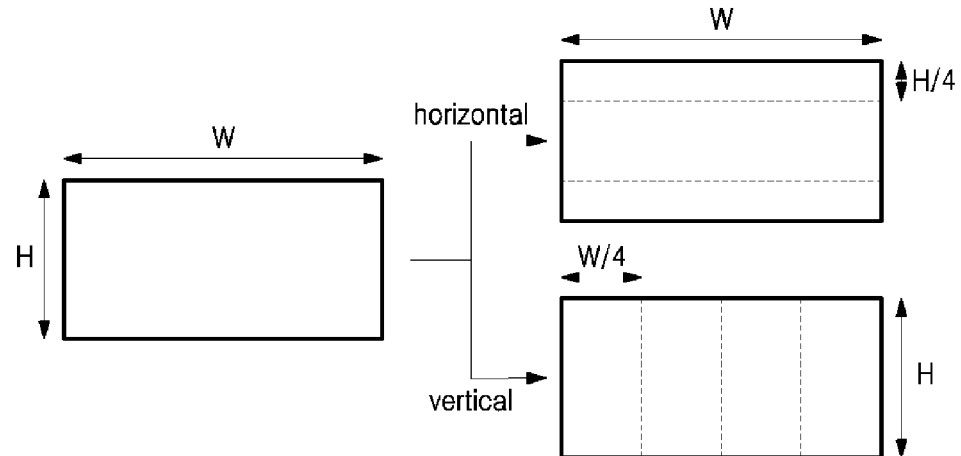

As illustrated in FIG. 7, the ISP technology or ISP mode refers to a technology for dividing a current block into multiple sub-blocks and performing prediction, transform, quantization, etc. for each sub-block. When the ISP mode is applied, the current block is divided according to its size into two sub-blocks (FIG. 7 at (a)) or into four sub-blocks (FIG. 7 at (b)). Since the minimum size of the current block to which the ISP mode can be applied is 4×8 or 8×4, when the current block is sized 4×4, the ISP technology is rendered to be off. When the current block is sized 4×8 or 8×4, the current block is bisected, and when the current block exceeds 4×8 or 8×4, the current block is quadrisected.

A flag indicating whether the ISP mode is applied or not (on/off) is first signaled from the video encoding apparatus to the video decoding apparatus, and when the ISP mode is on, information is additionally signaled on the direction in which the current block is split. The ISP mode is turned on only when the reference line index in the MRL mode is "0," and it is applicable to both MPM modes and non-MPM modes and applies to both directional modes and non-directional modes.

The regular intra prediction (Regular) is a commonly used intra prediction technique or mode, and it refers to a case in which the reference line index in the MRL mode is "0" and a case in which the ISP mode is off. The Regular mode is applicable to both MPM modes and non-MPM modes and applies to both directional modes and non-directional modes.

Table 1 shows syntaxes and structures of the MRL mode, ISP mode, and Regular mode.

TABLE 1

```
if( treeType = = SINGLE_TREE || treeType = = DUAL_TREE_LUMA ) {
    if( ( y0 % CtbSizeY ) > 0 )
        intra_luma_ref_idx[ x0 ][ y0 ]                                      ae(v)
    if(intra_luma_ref_idx[ x0 ][ y0 ] = = 0 &&
        ( cbWidth <= MaxTbSizeY || cbHeight <= MaxTbSizeY) &&
        ( cbWidth * cbHeight > MinTbSizeY * MinTbSizeY ))
        intra_subpartitions_mode_flag[ x0 ][ y0 ]                            ae(v)
    if( intra_subpartitions_mode_flag[ x0 ][ y0 ] = = 1 &&
        cbWidth <= MaxTbSizeY && cbHeight <= MaxTbSizeY)
        intra_subpartitions_split_flag[ x0 ][ y0 ]                           ae(v)
    if( intra_luma_ref_idx[ x0 ][ y0 ] = = 0)
        intra_luma_mpm_flag[ x0 ][ y0 ]                                      ae(v)
    if( intra_luma_mpm_flag[ x0 ][ y0 ] )
        intra_luma_mpm_idx[ x0 ][ y0 ]                                       ae(v)
    else
        intra_luma_mpm_remainder[ x0 ][ y0 ]                                 ae(v)
}
if( treeType = = SINGLE_TREE || treeType = = DUAL_TREE_CHROMA )
    intra_chroma_pred_mode[ x0 ][ y0 ]                                       ae(v)
```

Syntaxes expressed in Table 1 are described below.

intra_luma_ref_idx: A syntax that indicates an index of a reference line. intra_luma_ref_idx≠0 means a reference line for MRL mode, and intra_luma_ref_idx=0 means a reference line for ISP mode or Regular mode. MRL mode is not executed in the first row of CTU.

intra_subpartitions_mode_flag: A syntax that indicates whether ISP mode is applied or not (on/off).

intra_subpartitions_split_flag: Information indicating a direction in which the current block is split when the ISP mode is on.

intra_luma_mpm_flag: Information indicating whether the intra prediction mode of the current block is included in the MPM list. When the MRL mode is on, the condition that intra_luma_mpm_flag=1 may be set or derived. Here, the occasion when the MRL mode is on means that intra_luma_ref_idx≠0.

intra_luma_mpm_idx: Information indicating one of the prediction modes included in the MPM list, which is the same prediction mode as the intra prediction mode of the current block. intra_luma_mpm_idx is signaled when intra_luma_mpm_flag=1.

intra_luma_mpm_remainder: Information indicating any one of non-MPM modes (the same prediction mode as the intra prediction mode of the current block). When intra_luma_mpm_flag=0, intra_luma_mpm_remainder is signaled.

A comparison of the three techniques described above is shown in Table 2.

TABLE 2

| | Ref idx | MPM | Mode |
|---|---|---|---|
| MRL | ! = 0 | MPM | Angular + DC |
| ISP | =0 | MPM + non-MPM | Angular + planar + DC |
| Regular | =0 | MPM + non-MPM | Angular + planar + DC |

As can be seen from Table 2, in the MRL mode, the index of the reference line is non-zero, only MPM modes are supported, and only directional modes and DC mode are supported. In the ISP mode, the index of the reference line is zero, both MPM modes and non-MPM modes are supported, and both directional modes and non-directional modes are supported. In the Regular mode, the index of the reference line is zero, both MPM modes and non-MPM modes are supported, and both directional modes and non-directional modes are supported.

The present disclosure intends to provide a method of configuring an MPM list that can be applied to all of the MRL mode, ISP mode, and Regular mode. Specifically, the present disclosure provides a method of configuring the MPM list by excluding the planar mode and/or DC mode (one or more of the non-directional modes) and signaling separate information for the non-directional modes.

Figure 8:
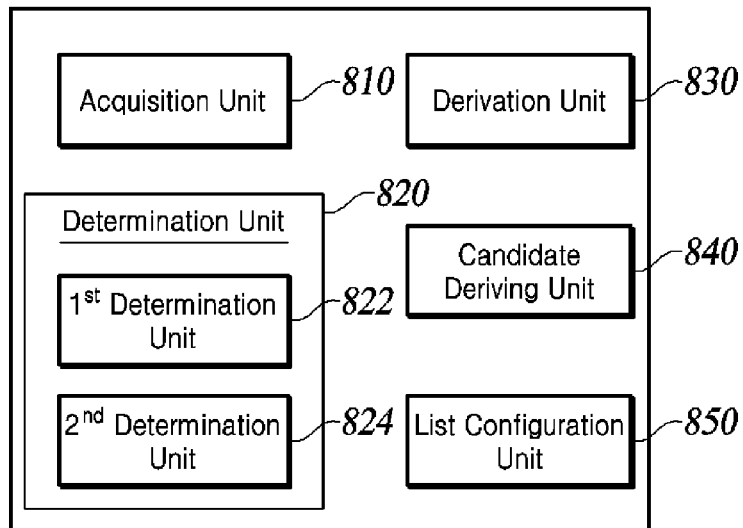
FIG. 8 is a block diagram of an example video encoding/decoding apparatus capable of implementing the techniques of the present disclosure.
Figure 9:
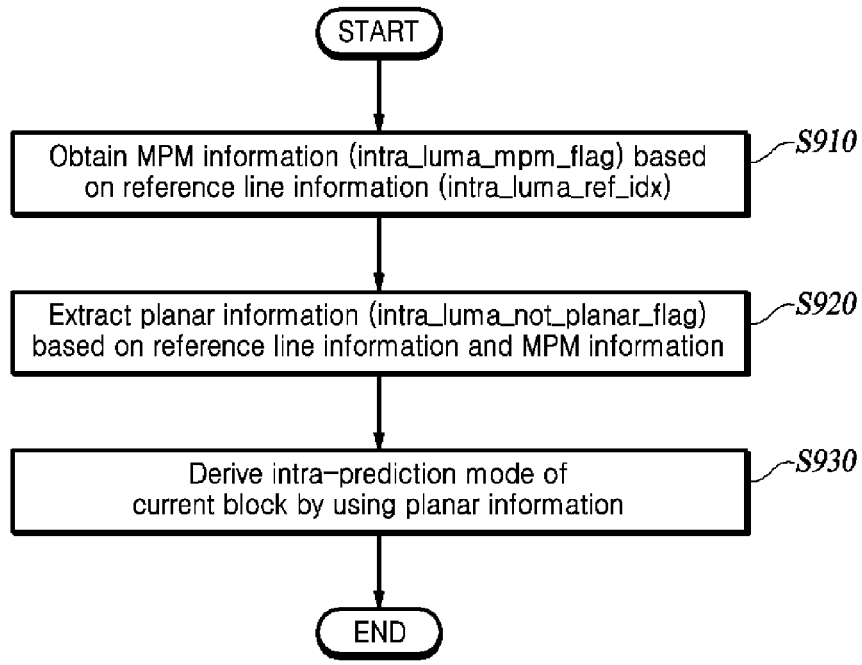
FIG. 9 is a flowchart of an illustrative embodiment of intra-prediction mode derivation.
Figure 10:
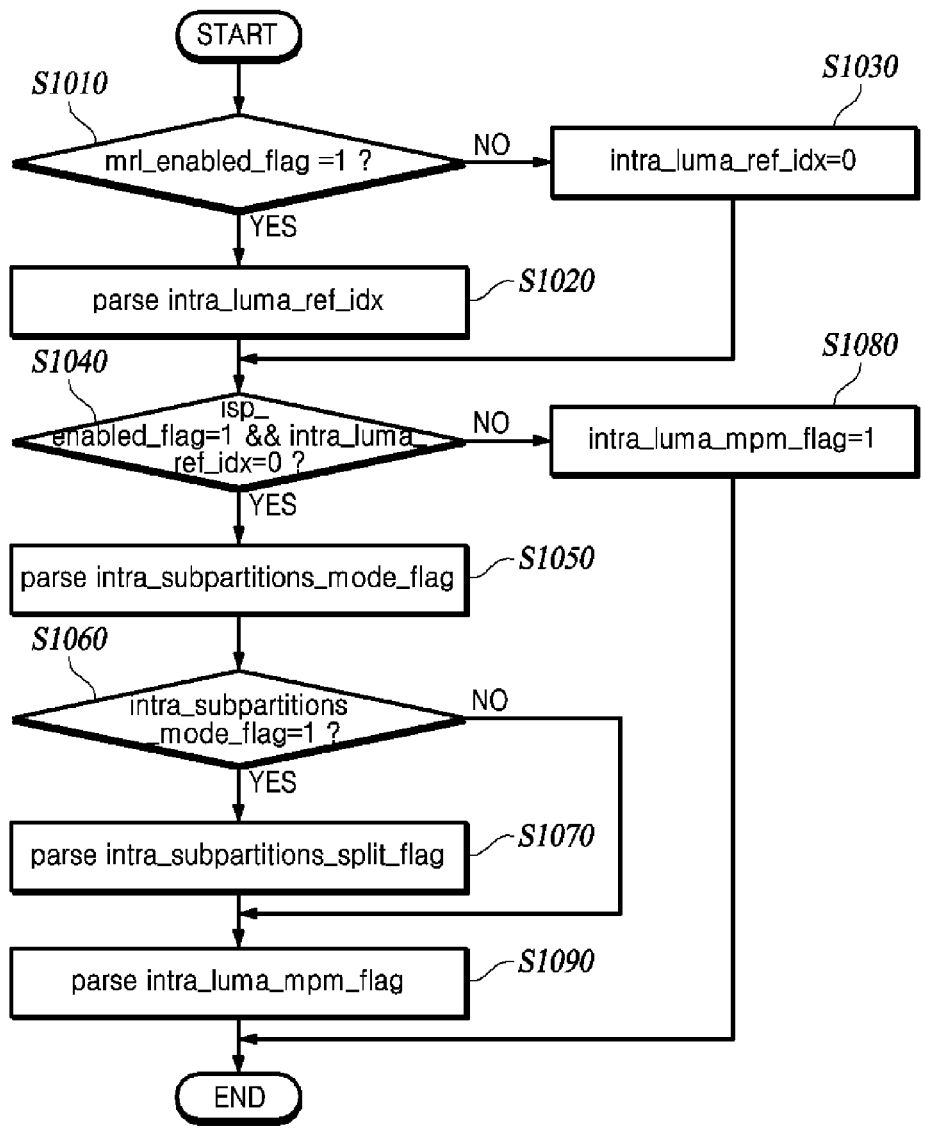
FIG. 10 is a flowchart of an illustrative embodiment for obtaining the most probable mode (MPM) information.
Figure 11:
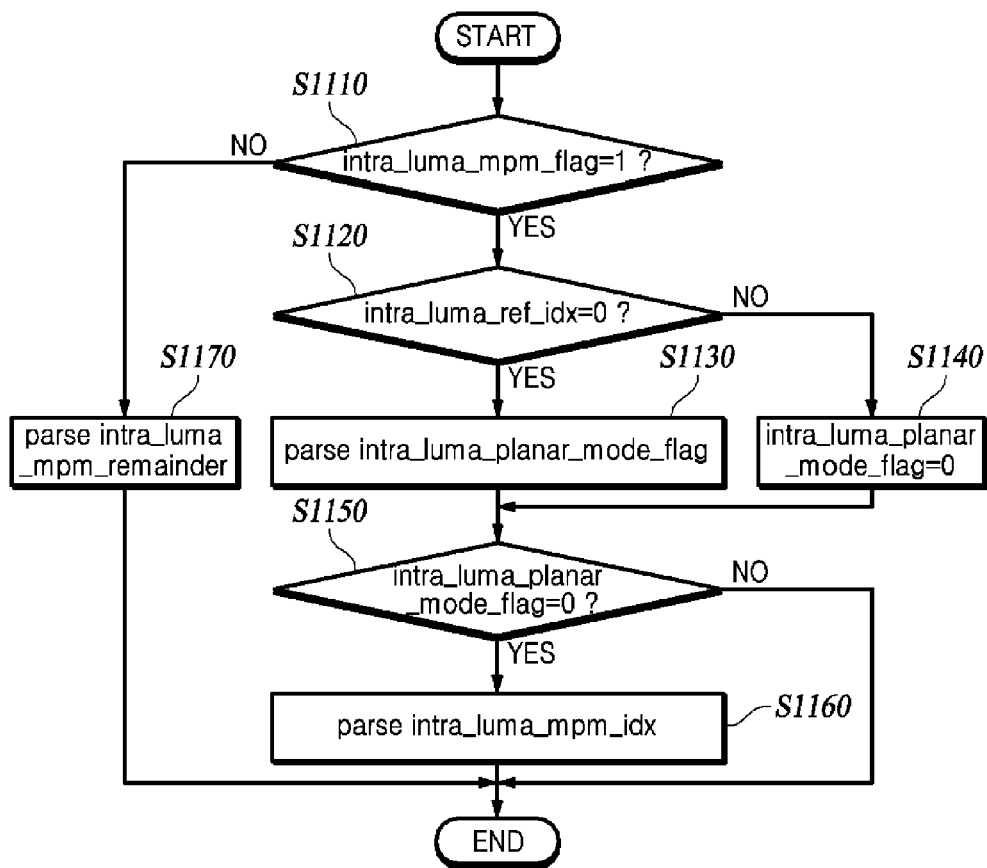
FIGS. 11 and 12 are flowcharts illustrating various embodiments for determining planar information.
Figure 12:
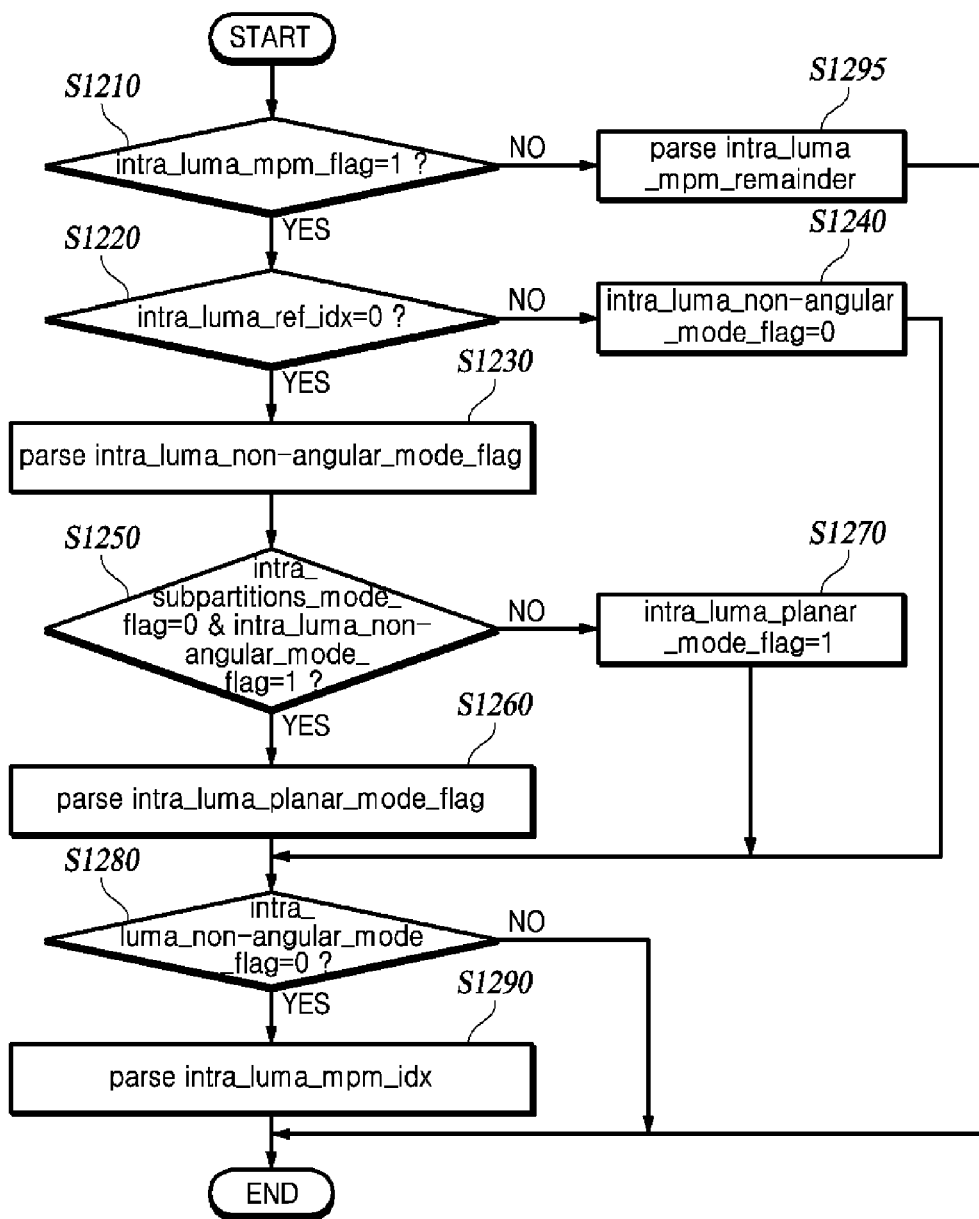
Figure 13:
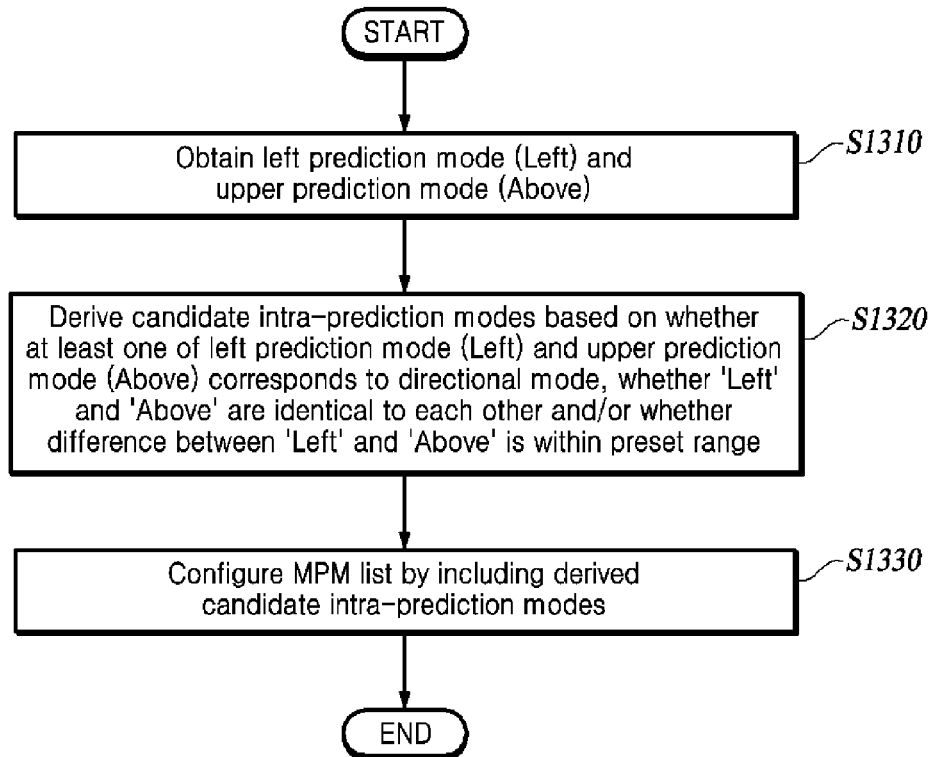
FIG. 13 is a flowchart of an illustrative embodiment of an MPM list configuration.

As shown in FIG. 8, a video encoding/decoding apparatus may include an acquisition unit 810, an determination unit 820, a derivation unit 830, a candidate deriving unit 840, and a list configuration unit 850. The determination unit 820 may include a first determination unit 822 and a second determination unit 824.

The acquisition unit 810 may obtain MPM information based on reference line information (in Step S910). Here, the reference line information is one indicating a reference line used for intra prediction of the current block among a plurality of reference lines. The reference line information may be implemented as intra_luma_ref_idx. When no reference line information is present, a reference line information may be set or derived as indicating a reference line having an index of 0 (intra_luma_ref_idx=0).

The MPM information is one indicating whether the current block's intra prediction mode (current intra mode) is included in the MPM list. The MPM information may be implemented as intra_luma_mpm_flag. When no MPM information is present (when multiple reference lines or MRL is on), an MPM information may be set or derived as indicating that the current block's intra prediction mode is included in the MPM list (intra_luma_mpm_flag=1).

The determination unit 820 may determine planar information based on the reference line information and the MPM information (S920). The planar information is one indicating whether the current block's intra prediction mode is the planar mode, and it may be implemented as intra_luma_planar_mode_flag or intra_luma_not_planar_flag. When planar information is absent, the planar information may be inferred as indicating that the current block's intra prediction mode is not the planar mode (intra_luma_planar_mode_flag=0, intra_luma_not_planar_flag=1).

When the planar information is implemented as intra_luma_planar_mode_flag, the condition that intra_luma_planar_mode_flag=1 may indicate that the current block's intra prediction mode is the planar mode, and the condition that intra_luma_planar_mode_flag=0 may indicate that the current block's intra prediction mode is not the planar mode.

When planar information is implemented as intra_luma_not_planar_flag, the condition that intra_luma_not_planar_flag=0 may indicate that the current block's intra prediction mode is the planar mode, and the condition that intra_luma_not_planar_flag=1 may indicate that the current block's intra prediction mode is not the planar mode.

The derivation unit 830 may derive the intra prediction mode of the current block by using the planar information (S930). For example, when the planar information indicates the planar mode, the planar mode may be set as the intra prediction mode of the current block. When the planar information does not indicate the planar mode, the intra prediction mode of the current block may be determined by what is indicated by the MPM information. Where the MPM information indicates that the intra prediction mode of the current block is included in the MPM list, the candidate intra prediction mode, which is indicated by the MPM index among the intra prediction modes (i.e., candidate intra prediction modes included in the MPM list), may be derived as the intra prediction mode of the current block. On the contrary, when the MPM information indicates that the intra prediction mode of the current block is not included in the MPM list, the non-MPM mode indicated by the non-MPM information (intra_luma_mpm_remainder) may be derived for the intra prediction mode of the current block.

Hereinafter, the respective steps described above will be described separately for each embodiment.

Embodiment 1

Embodiment 1 is for the process of obtaining MPM information.

First, the video encoding apparatus may signal reference line information (intra_luma_ref_idx) by including the same in a bitstream to the video decoding apparatus. The video decoding apparatus may decode the reference line information from the bitstream (S1020).

MRL Mode

When the reference line information indicates a reference line having an index other than "0" (intra_luma_ref_idx≠0), the MRL mode may be applied to intra prediction of the current block. Since the MRL mode supports the MPM modes exclusively, the video encoding apparatus may not signal the MPM information (intra_luma_mpm_flag), and the MPM information may be derived or set to "1" (intra_luma_mpm_flag=1).

When the decoded reference line information indicates a reference line having an index other than "0" (intra_luma_ref_idx≠0) in Step S1040, since the MPM information is not signaled, the video decoding apparatus may obtain the MPM information by inducing or setting the same to "1" (intra_luma_mpm_flag=1) in Step S1080.

ISP Mode

When the reference line information indicates a reference line having an index of "0" (intra_luma_ref_idx=0), the ISP mode or the Regular mode may be applied to intra prediction of the current block. To distinguish between the ISP mode and the Regular mode, the video encoding apparatus may signal, to the video decoding apparatus, information (intra_subpartitions_mode_flag) indicating whether to apply the ISP mode by including the same in the bitstream.

Additionally, when the ISP mode is applied (intra_subpartitions_mode_flag=1), the video encoding apparatus may signal information (intra_subpartitions_split_flag) indicating the splitting direction of the current block by further including the same in the bitstream. Furthermore, since the ISP mode supports both MPM modes and non-MPM modes, the video encoding apparatus may signal MPM information.

When the decoded reference line information indicates a reference line having an index of "0" (intra_ref_idx=0) in Step S1040, the video decoding apparatus may distinguish the ISP mode from the Regular mode by further decoding information indicating whether the ISP mode is applied (S1050). When this information indicates that the ISP mode is applied (intra_subpartitions_mode_flag=1) in Step S1060, the video decoding apparatus may further decode information indicating the splitting direction (intra_subpartition_split_flag) in Step S1070. Furthermore, the video decoding apparatus may obtain the MPM information by decoding the same from the bitstream (S1090).

Regular Mode

When the ISP mode is not applied (intra_subpartitions_mode_flag=0), the Regular mode may be used for intra prediction of the current block. Since the Regular mode supports both MPM modes and non-MPM modes, the video encoding apparatus may signal MPM information to the video decoding apparatus.

When the information indicating whether or not the ISP mode is applied indicates that the ISP mode is not applied (intra_subpartitions_mode_flag=0) in Step S1060, the Regular mode may be used for intra prediction of the current block. In this case, the video decoding apparatus may decode and obtain the MPM information from the bitstream (S1090).

Table 3 shows the syntax structure for Embodiment 1 described above.

Step S1010), but it may infer the reference line information as indicating a reference line having an index of "0" (intra_luma_ref_idx=0).

The video encoding apparatus may signal intra_subpartitions_mode_flag and intra_subpartitions_split_flag when the ISP mode is enabled (isp_enabled_flag=1), and may not signal intra_subpartitions_mode_flag and intra_subpartitions_split_flag when the ISP mode is disabled (isp_enabled_flag=0). In response, when the ISP mode is enabled (isp_enabled_flag=1) while the reference line information indicates a reference line having an index of "0" (intra_luma_ref_idx=0) in Step S1040, the video decoding apparatus may decode intra_subpartitions_mode_flag and intra_subpartitions_split_flag in Steps S1050 and S1070. When the ISP mode is disabled (isp_enabled_flag=0) or the reference line information indicates a reference line having an index other than "0" (intra_luma_ref_idx≠0) in Step S1040, the video decoding apparatus may not decode intra_subpartitions_mode_flag and intra_subpartitions_split_flag (S1050, S1070).

Embodiment 2

Embodiment 2 concerns the step of determining the planar information and the step of deriving the current block's intra prediction mode based on the planar information.

In Embodiment 2 and Embodiment 3 to be described below, it is assumed that a total of 67 intra prediction modes are used to derive the intra prediction mode of the current

TABLE 3

```
if( treeType = = SINGLE_TREE || treeType = = DUAL_TREE_LUMA ) {
  if( ( y0 % CtbSizeY ) > 0 )
    intra_luma_ref_idx[ x0 ][ y0 ]                                  ae(v)
  if (intra_luma_ref_idx[ x0 ][ y0 ] = = 0 &&
      ( cbWidth <= MaxTbSizeY || cbHeight <= MaxTbSizeY) &&
      ( cbWidth * cbHeight > MinTbSizeY * MinTbSizeY ))
    intra_subpartitions_mode_flag[ x0 ][ y0 ]                       ae(v)
  if( intra_subpartitions_mode_flag[ x0 ][ y0 ] = = 1 &&
      cbWidth <= MaxTbSizeY && cbHeight <= MaxTbSizeY)
    intra_subpartitions_split_flag[ x0 ][ y0 ]                      ae(v)
  if( intra_luma_ref_idx[ x0 ][ y0 ] = = 0)
    intra_luma_mpm_flag[ x0 ][ y0 ]                                 ae(v)
```

Some embodiments implement the step of obtaining MPM information by using information indicating the activation/deactivation (enablement/disenablement, i.e., on/off) of the MRL mode (e.g., mrl_enabled_flag) or information indicating the activation/deactivation (on/off) of the ISP mode (e.g., isp_enabled_flag).

The information indicating the activation/deactivation of the MRL mode and the information indicating the activation/deactivation of the ISP mode may be defined in one or more positions of a sequence parameter set, a picture parameter set, a slice header, and a tile group header.

The video encoding apparatus may signal the reference line information when the MRL mode is enabled (mrl_enabled_flag=1), and it may not signal the reference line information when the MRL mode is not enabled (mrl_enabled_flag=0) but set or derive the reference line information as indicating a reference line having an index of "0" (intra_luma_ref_idx=0). The video decoding apparatus in Step S1020 may decode the reference line information when the MRL mode is enabled (mrl_enabled_flag=1 in Step S1010), and it may not decode the reference line information when the MRL mode is not enabled (mrl_enabled_flag=0 in block. The total of 67 intra prediction modes may include two non-directional modes (planar mode and DC mode) and 65 directional modes.

Embodiment 2 may be divided into two embodiments as follows according to the type of the non-directional mode excluded from the MPM list among the non-directional modes (planar mode and DC mode).

Embodiment 2-1

In embodiment 2-1, the planar mode alone may be excluded from the MPM list. In other words, in Embodiment 2-1, the MPM list may be configured by using the DC mode and the directional modes.

MRL Mode

MRL mode may support MPM modes, support directional modes and DC mode, and support reference lines having an index other than "0". Accordingly, with the MRL mode applied, the MPM information may indicate the current intra mode (the intra prediction mode of the current block) as included in the MPM list (intra_luma_mpm_flag=1), and the reference line information may indicate a reference line having an index other than "0" (intra_luma_ref_idx≠0).

When MPM information indicates the current intra mode as included in the MPM list (intra_luma_mpm_flag=1) while the reference line information indicates a reference line having an index other than "0" (intra_luma_ref_idx≠0), the planar information may be infer as a value indicating that the current intra mode is not the planar mode (intra_luma_planar_mode_flag=0 or intra_luma_not_planar_mode_flag=1).

Additionally, to indicate any one of the candidate intra prediction modes included in the MPM list, the MPM index (intra_luma_mpm_idx) may be signaled to the video decoding apparatus. Here, the MPM index may be information indicating any one of the candidate intra prediction modes (MPM modes) included in the MPM list.

The video decoding apparatus may determine MPM information and reference line information (S1110, S1120). With the MRL mode applied, the MPM information may indicate the current intra mode as included in the MPM list (intra_luma_mpm_flag=1), and the reference line information may indicate a reference line having an index other than "0" (intra_luma_ref_idx≠0).

Additionally, the planar information may not be signaled and may be inferred as a value not indicating the planar mode (intra_luma_planar_mode_flag=0) in Step S1140.

Since the planar information does not indicate the planar mode (intra_luma_planar_mode_flag=0 or intra_luma_not_planar_mode_flag=1) in Step S1150, the MPM index may be decoded from the bitstream (S1160). Additionally, the candidate intra prediction mode in the MPM list, as indicated by the MPM index may be derived as the current block's intra prediction mode.

ISP Mode

The ISP mode may support both MPM modes and non-MPM modes, support both directional modes and non-directional modes, and support a reference line having an index of "0." Accordingly, with the ISP mode applied, the MPM information may indicate that the current intra mode is included in the MPM list (intra_luma_mpm_flag=1) or indicate the current intra mode is not included in the MPM list (intra_luma_mpm_flag=0). The reference line information may indicate a reference line having an index of "0" (intra_luma_ref_idx=0).

When MPM information indicates that the current intra mode is included in the MPM list (intra_luma_mpm_flag=1) while the reference line information indicates a reference line having an index of "0" (intra_luma_ref_idx=0), the planar information may be signaled to the video decoding apparatus.

When the planar information indicates that the current intra mode is not the planar mode (intra_luma_planar_mode_flag=0 or intra_luma_not_planar_mode_flag=1), the MPM index may be signaled to the video decoding apparatus. On the contrary, when the planar information indicates that the current intra mode is the planar mode (intra_luma_planar_mode_flag≠0 or intra_luma_not_planar_mode_flag=0), the MPM index may not be signaled to the video decoding apparatus.

The video decoding apparatus may determine MPM information and reference line information (S1110, S1120). With the ISP mode applied, the MPM information may indicate that the current intra mode is included in the MPM list (intra_luma_mpm_flag=1) or indicate that the current intra mode is not included in the MPM list (intra_luma_mpm_flag=0). The reference line information may indicate a reference line having an index of "0" (intra_luma_ref_idx=0).

When intra_luma_mpm_flag=0 (S1110), non-MPM information may be decoded from the bitstream (S1170). When intra_luma_mpm_flag=1 (S1110), since intra_luma_ref_idx=0 (S1120), the planar information may be decoded from the bitstream and thereby the value thereof may be determined (S1130).

When the planar information does not indicate the planar mode (intra_luma_planar_mode_flag=0 or intra_luma_not_planar_mode_flag=1, S1150), the MPM index may be decoded from the bitstream (S1160). Additionally, the candidate intra prediction mode, as indicated by the MPM index, in the MPM list may be set as the intra prediction mode of the current block. On the contrary, when the planar information indicates the planar mode (intra_luma_planar_mode_flag=1 or intra_luma_not_planar_mode_flag=0, S1150), the planar mode may be set as the intra prediction mode of the current block.

Regular Mode

The Regular mode may support MPM modes and non-MPM modes, support directional modes and non-directional modes, and support a reference line having an index of "0." Therefore, with the Regular mode applied, the MPM information may indicate the current intra mode is included in the MPM list (intra_luma_mpm_flag=1) or indicate that the current intra mode is not included in the MPM list (intra_luma_mpm_flag≠1), and the reference line information may indicate a reference line having an index of "0" (intra_luma_ref_idx=0).

When the MPM information indicates that the current intra mode is not included in the MPM list (intra_luma_mpm_flag=0), non-MPM information (intra_luma_mpm_remainder) may be signaled to the video decoding apparatus. Here, the non-MPM information may be information indicating one of the candidate intra prediction modes (non-MPM modes) included in the non-MPM list.

On the contrary, when MPM information indicates that the current intra mode is included in the MPM list (intra_luma_mpm_flag=1) and the reference line information indicates a reference line having an index of "0" (intra_luma_ref_idx=0), the planar information may be signaled to the video decoding apparatus.

When the planar information indicates that the current intra mode is not the planar mode (intra_luma_planar_mode_flag=0 or intra_luma_not_planar_mode_flag=1), the MPM index may be signaled to the video decoding apparatus. On the contrary, when the planar information indicates that the current intra mode is the planar mode (intra_luma_planar_mode_flag≠0 or intra_luma_not_planar_mode_flag=0), the MPM index may not be signaled.

The video decoding apparatus may determine MPM information and reference line information (S1110, S1120). When the MPM information indicates that the current intra mode is not included in the MPM list (intra_luma_mpm_flag=0), non-MPM information may be decoded from the bitstream (S1170), and the candidate intra prediction mode in the non-MPM list, as indicated by the non-MPM information may be selected as the current block's intra prediction mode.

On the contrary, when MPM information indicates that the current intra mode is included in the MPM list (intra_luma_mpm_flag=1), reference line information may be determined (S1120). When the reference line information indicates a reference line having an index of 0" (intra_luma_ref_idx=0), planar information may be decoded from the bitstream (S1130).

When the planar information does not indicate the planar mode (intra_luma_planar_mode_flag=0 or intra_luma_not_ planar_mode_flag=1) in Step S1150, the MPM index may be decoded from the bitstream (S1160), and the candidate intra prediction mode in the MPM list, as indicated by the MPM index may be derived for the intra prediction mode of the current block. On the contrary, when the planar information indicates the planar mode (intra_luma_planar_mode_flag=1 or intra_luma_not_planar_mode_flag=0) in Step S1150, the planar mode may be derived for the intra prediction mode of the current block.

Table 4 shows the syntax structure of Embodiment 2-1 described above.

TABLE 4

| |
|---|
| if( intra_luma_mpm_flag[ x0 ][ y0 ] ) { |
|   if( intra_luma_ref_idx[ x0 ][ y0 ] = = 0 ) |
|     intra_luma_planar_mode_flag[ x0 ][ y0 ] |
|   if( intra_luma_planar_mode_flag[ x0 ][ y0 ] = = 0 ) |
|     intra_luma_mpm_idx[ x0 ][ y0 ]    ae(v) |
| } |
| else |
|   intra_luma_mpm_remainder[ x0 ][ y0 ]    ae(v) |

Embodiment 2-2

In Embodiment 2-2, non-directional modes, i.e., the planar mode and DC mode may be excluded from the MPM list. In other words, Embodiment 2-2 may configure the MPM list by using only the directional modes.

Compared with Embodiment 2-1, Embodiment 2-2 may distinguish between the planar mode and the DC mode by further using non-directional information (e.g., intra_luma_non_angular_mode_flag) indicating whether the current block's intra prediction mode corresponds to the non-directional mode. The condition that Intra_luma_non-angular_mode_flag=1 may indicate that the current block's intra prediction mode corresponds to the non-directional mode (planar mode or DC mode), and the condition that intra_luma_non_angular_mode_flag=0 may indicate that the current block's intra prediction mode corresponds to the directional mode. When the non-directional mode is absent, the current block's intra prediction mode may be set or derived into a value indicating that the current block's intra prediction mode corresponds to the directional mode (intra_luma_non-angular_mode_flag=0).

The step of determining the non-directional information may be performed by the first determination unit 822, and the step of determining the planar information may be performed by the second determination unit 824.

MRL Mode

When the MPM information indicates the current intra mode is included in the MPM list (intra_luma_mpm_flag=1) while the reference line information indicates a reference line having an index other than "0" (intra_luma_ref_idx≠0), non-directional information (intra_luma_non-angular_mode_flag) may be set or derived into a value indicating that the current intra mode does not correspond to the non-directional mode (intra_luma_non-angular_mode_flag=0).

With the non-directional information set to indicate that the current intra mode does not correspond to the non-directional mode (intra_luma_non-angular_mode_flag=0), the MPM index may be signaled to the video decoding apparatus to indicate one of the candidate intra prediction modes included in the MPM list.

The video decoding apparatus may determine MPM information and reference line information (S1210, S1220). When the MRL mode is applied, the MPM information may indicate the current intra mode is included in the MPM list (intra_luma_mpm_flag=1) in Step S1210, and the reference line information may indicate a reference line having an index other than "0" (intra_luma_ref_idx≠0) in Step S1220. Accordingly, the non-directional information may be inferred as a value indicating that the current intra mode does not correspond to the non-directional mode (intra_luma_non-angular_mode_flag=0) in Step S1240.

Additionally, with the non-directional information indicating that the current intra mode does not correspond to the non-directional mode (intra_luma_non-angular_mode_flag=0, S1280), the MPM index may be decoded from the bitstream (S1290). Furthermore, the candidate intra prediction mode in the MPM list as indicated by the MPM index may be derived as the intra prediction mode of the current block.

ISP Mode

When MPM information indicates that the current intra mode is included in the MPM list (intra_luma_mpm_flag=1) while the reference line information indicates a reference line having an index of "0" (intra_luma_ref_idx=0), non-directional information (intra_luma_non-angular_mode_flag) may be signaled to the video decoding apparatus.

With the ISP mode applied (intra_subpartitions_mode_flag=1), the planar information may be inferred as a value that indicates the current block's intra-prediction mode is the planar mode (intra_luma_planar_mode_flag=1 or intra_luma_not_planar_mode_flag=0). Additionally, with the planar information indicating that the current intra mode is the planar mode (intra_luma_planar_mode_flag=1 or intra_luma_not_planar_mode_flag=0), the MPM index may not be signaled to the video decoding apparatus.

The video decoding apparatus may determine MPM information and reference line information (S1210, S1220). When the ISP mode is applied, the MPM information may indicate the current intra mode as included in the MPM list (intra_luma_mpm_flag=1) in Step S1210, and the reference line information may indicate a reference line having an index of "0" (intra_luma_ref_idx=0) in Step S1220. Accordingly, non-directional information may be decoded from the bitstream (S1230).

Since the ISP mode is applied and intra_subpartitions_mode_flag=1 (S1250), the planar information may be inferred as a value indicating that the current block's intra-prediction is mode the planar mode (intra_luma_planar_mode_flag=1 or intra_luma_not_planar_mode_flag=0, S1270).

When the non-directional information indicates that the current intra mode corresponds to) the non-directional mode (intra_luma_non-angular_mode_flag=0, S1250), the planar mode may be derived as the intra prediction mode of the current block. On the other hand, when the non-directional information indicates that the current intra mode does not correspond to the non-directional mode (intra_luma_non-angular_mode_flag=1) in Step S1280, the MPM index is decoded from the bitstream (S1290), and a candidate intra prediction mode in the MPM list as indicated by the MPM index may be derived as the intra prediction mode of the current block.

Regular Mode

When MPM information indicates that the current intra mode is not included in the MPM list (intra_luma_mpm_flag=0), non-MPM information (intra_luma_mpm_remainder) may be signaled to the video decoding apparatus. On the contrary, when MPM information indicates that the current intra mode is included in the MPM list (intra_luma_mpm_flag=1) while the reference line information indicates a reference line having an index of "0" (intra_luma_ref_idx=0), non-directional information (intra_luma_non-angular_mode_flag) may be signaled to the video decoding apparatus.

Additionally, when the ISP mode is not applied (intra_subpartitions_mode_flag=0) and the non-directional information indicates that the current intra mode corresponds to the non-directional mode (intra_luma_non-angular_mode_flag=1), planar information may be signaled to the video decoding apparatus. On the contrary, when the ISP mode is applied (intra_subpartitions_mode_flag=1) or the non-directional information indicates that the current intra mode does not correspond to the non-directional mode (intra_luma_non-angular_mode_flag=0), the planar information may be inferred as a value indicating that the current intra mode is the planar mode (intra_luma_planar_mode_flag=1 or intra_luma_not_planar_mode_flag=0). Since the Regular mode is applied, this step may assume that intra_subpartitions_mode_flag=0.

When the non-directional information indicates that the current intra mode corresponds to the non-directional mode (intra_luma_non-angular_mode_flag=1), the MPM index (intra_luma_mpm_idx) may be signaled to the video decoding apparatus. On the contrary, when the non-directional information indicates that the current intra mode does not correspond to the non-directional mode (intra_luma_non-angular_mode_flag=0), the MPM index (intra_luma_mpm_idx) may not be signaled.

The video decoding apparatus may determine MPM information and reference line information (S1210, S1220). When the MPM information indicates that the current intra mode is not included in the MPM list (intra_luma_mpm_flag=0), non-MPM information (intra_luma_mpm_remainder) may be decoded from the bitstream (S1295), and a candidate intra prediction mode in the non-MPM list as indicated by the syntax of intra_luma_mpm_remainder may be derived as the intra prediction mode of the current block.

On the contrary, when MPM information indicates that the current intra mode is included in the MPM list (intra_luma_mpm_flag=1, S1210), reference line information may be determined (S1220). When the reference line information indicates a reference line having an index of "0" (intra_luma_ref_idx=0, S1220), the non-directional information may be decoded from the bitstream (S1230) and thereby the value thereof may be determined.

When the ISP mode is not applied (intra_subpartitions_mode_flag=0) and the non-directional information indicates that the current intra mode corresponds to the non-directional mode (intra_luma_non-angular_mode_flag=1) (S1250), planar information may be decoded from the bitstream. On the contrary, when the ISP mode is applied (intra_subpartitions_mode_flag=1) or when the non-directional information indicates that the current intra mode does not corresponds to the non-directional mode (intra_luma_non-angular_mode_flag=0) (S1250), the planar information may be inferred as a value indicating that the current intra mode is the planar mode (intra_luma_planar_mode_flag=1 or intra_luma_not_planar_mode_flag=0) in Step S1270. Since the Regular mode is applied, intra_subpartitions_mode_flag=0 may be assumed at S1270.

When the non-directional information indicates that the current intra mode does not correspond to the non-directional mode (intra_luma_non-angular_mode_flag=0) in Step S1280, the MPM index (intra_luma_mpm_idx) may be decoded from the bitstream (S1290). In this case, the candidate intra prediction mode in the MPM list, as indicated by the decoded MPM index may be derived as the intra prediction mode of the current block.

On the contrary, when the non-directional information indicates that the current intra mode corresponds to the non-directional mode (intra_luma_non-angular_mode_flag=1) in Step S1280, the current block's intra prediction mode may be derived by what is indicated by the planar information. Specifically, when the planar information indicates that the current block's intra-prediction mode is the planar mode (intra_luma_planar_mode_flag=1 or intra_luma_not_planar_mode_flag=0), the planar mode is derived as the intra prediction mode of the current block, and when the planar information indicates that the current block's intra-prediction mode is not the planar mode (intra_luma_planar_mode_flag)=0 or intra_luma_not_planar_mode_flag=1), the DC mode may be derived as the intra prediction mode of the current block.

Table 5 shows the syntax structure for the operation of the video encoding/decoding apparatus described above.

TABLE 5

```
if( intra_luma_mpm_flag[ x0 ][ y0 ] ) {
   if( intra_luma_ref_idx[ x0 ][ y0 ] = = 0 )
      intra_luma_non-angular_mode_flag[ x0 ][ y0 ]
   if( intra_luma_ref_idx[ x0 ][ y0 ] = = 0 &&
      intra_subpartitions_mode_flag[ x0 ][ y0 ] == 0 &&
      intra_luma_non-angular_mode_flag[ x0 ][ y0 ] == 1 )
      intra_luma_planar_mode_flag[ x0 ][ y0 ]
   if( intra_luma_non-angular_mode_flag[ x0 ][ y0 ] = = 0 )
      intra_luma_mpm_idx[ x0 ][ y0 ]                              ae(v)
}
else
   intra_luma_mpm_remainder[ x0 ][ y0 ]                           ae(v)
```

Embodiment 3

Embodiment 3 provides various embodiments for configuring the MPM list.

Figure 14:
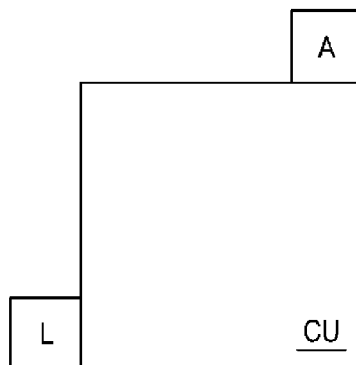
FIG. 14 is a diagram illustrating neighboring blocks used for MPM list configuration.
Figure 15:
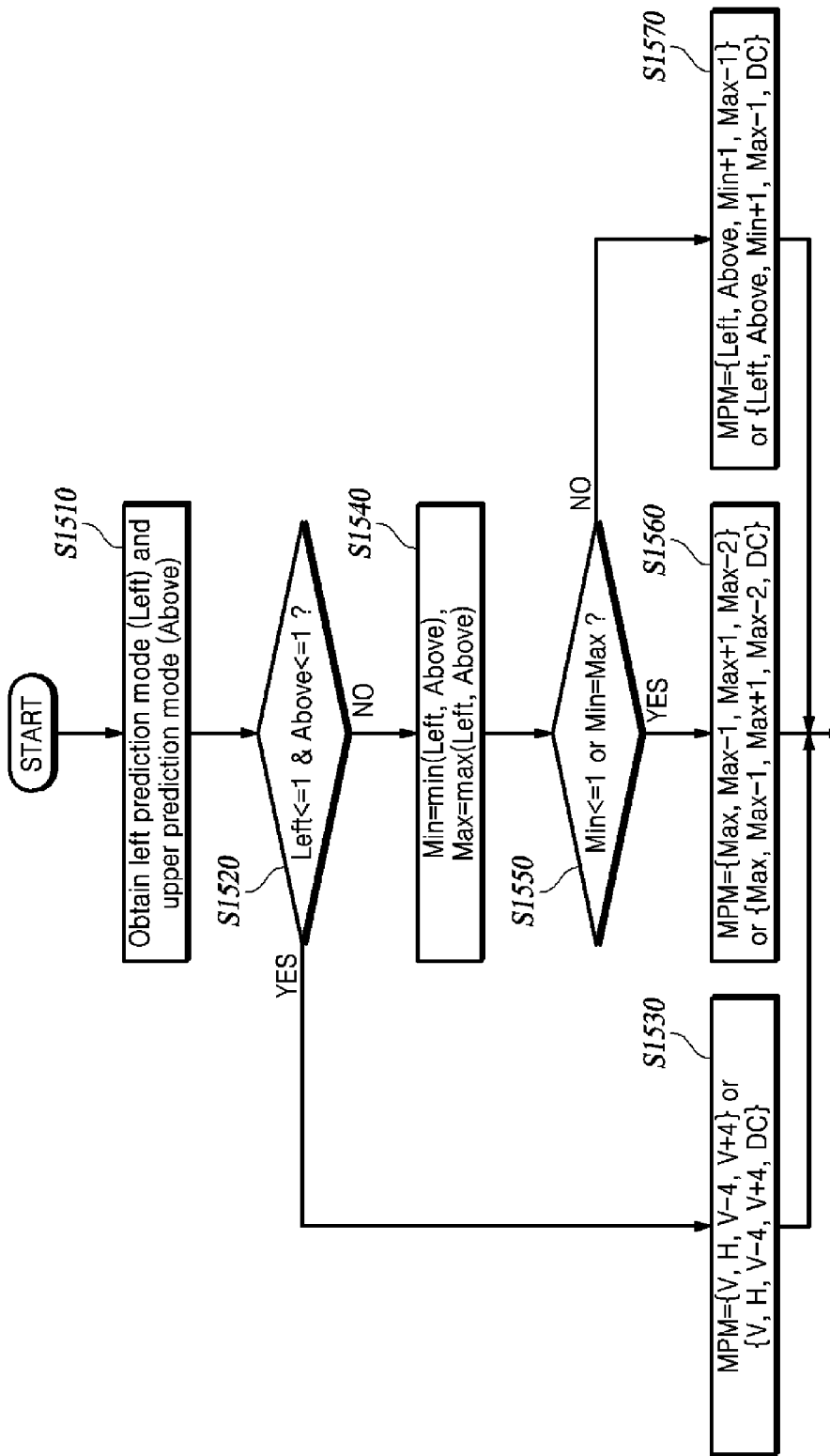
FIGS. 15 and 16 are flowcharts illustrating various embodiments of MPM list configuration.
Figure 16:
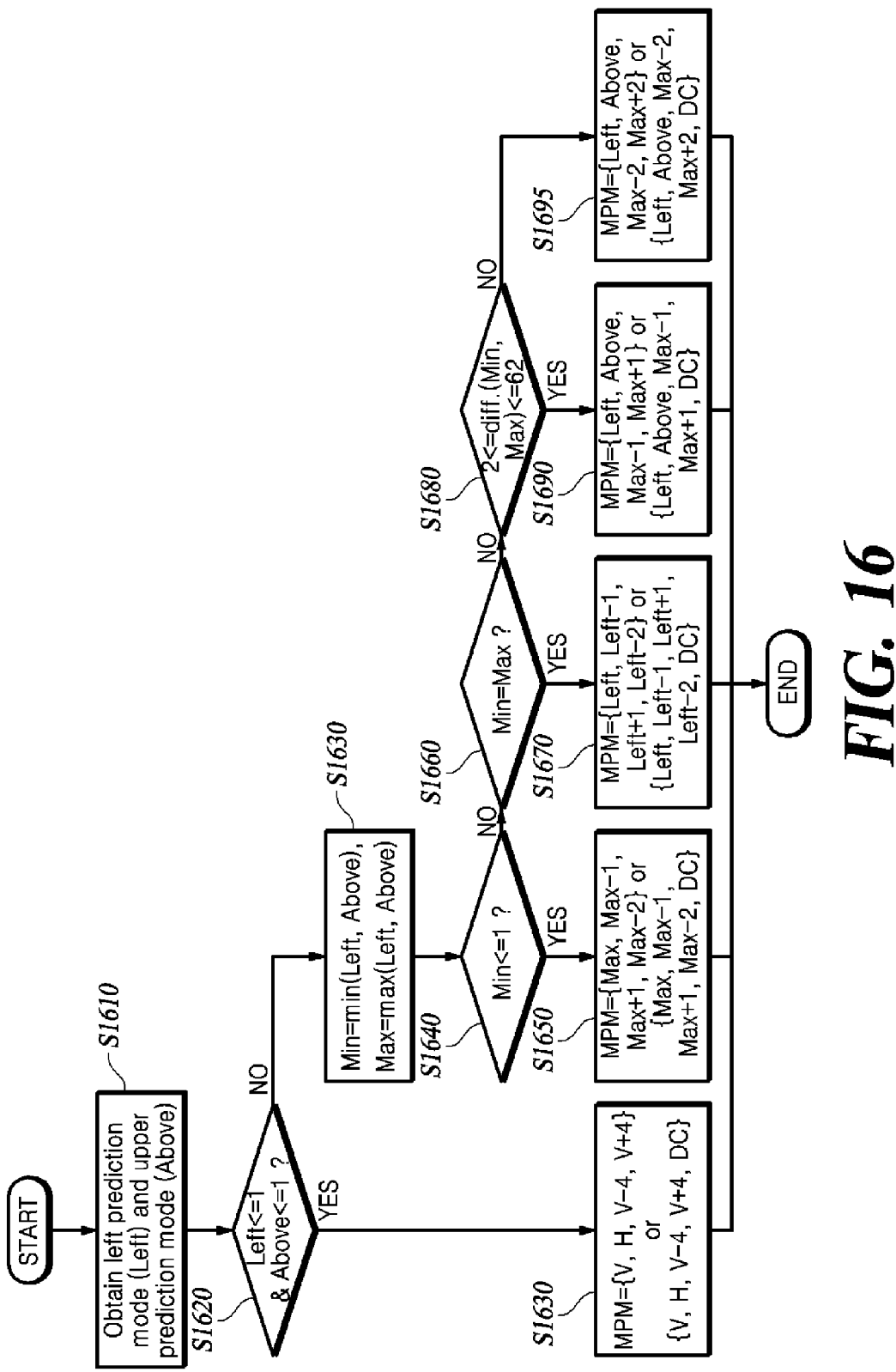

Neighboring blocks of the current block may be used as blocks for configuring the MPM list. As shown in FIG. 14, the third embodiment may configure an MPM list by using a left block L located leftward of the current block CU and an upper block A located upward of the current block CU. Hereinafter, the prediction mode of left block L is referred to as a left prediction mode (Left), and the prediction mode of upper block A is referred to as an upper prediction mode (Above).

The video encoding/decoding apparatus (candidate deriving unit) may obtain a left prediction mode (Left) from left block L and obtain an upper prediction mode (Above) from upper block A (S1310). In this process, a determination may be made on the availability of the left prediction mode (Left) and the upper prediction mode (Above), and as a result, a step may be performed for setting or modifying an unavailable prediction mode to the planar mode.

The video encoding/decoding apparatus (candidate deriving unit) may apply various criteria to the left prediction mode (Left) and the upper prediction mode (Above) to derive candidate intra prediction modes (MPM modes) to be included in the MPM list (S1320).

The various criteria may include whether at least one of the left prediction mode (Left) and the upper prediction mode (Above) corresponds to the directional mode, and whether the left prediction mode (Left) and the upper prediction mode (Above) are identical to each other. The various criteria may further include determining whether the left prediction mode (Left) and the upper prediction mode (Above) are different directional modes, and if so, determining whether the difference between the left prediction mode (Left) and the upper prediction mode (Above) is within a preset range.

The video encoding/decoding apparatus (list configuration unit) may configure the MPM list by including the candidate intra prediction modes that are derived (S1330). The MPM list may include one or more directional modes. The MPM list may further include a DC mode that is a non-directional mode. For example, the MPM list may consist of only 4 or 5 directional modes. Alternatively, the MPM list may be composed of a total of 4 or 5 intra prediction modes inclusive of a DC mode and directional modes.

When the MPM list is configured by including the DC mode, the DC mode may be positioned at the end of the MPM list. In other words, among the prediction modes included in the MPM list, the largest index may be allocated to the DC mode (located at the end of the MPM list). Conversely, the smallest index may be allocated to the DC mode (at the beginning of the MPM list).

For example, when the MPM list is configured as {3, DC, 12, 4, 45}, to represent the mode No. "12" for the intra prediction mode of the current block, index "2" corresponding to the mode No. "12" may be expressed as "001" (truncated unary method). On the other hand, when the MPM list is configured as {3, 12, 4, 45, DC}, to represent the mode No. "12" for the intra prediction mode of the current block, index "1" corresponding to the mode No. "12" may be expressed as "01."

Embodiment 3 may be divided into the following specific embodiments according to criteria applied to the left prediction mode (Left) and the upper prediction mode (Above).

Embodiment 3-1

When the left prediction mode (Left) and the upper prediction mode (Above) are obtained (S1510), it can be determined whether both the left prediction mode (Left) and the upper prediction mode (Above) correspond to the non-directional mode (S1520).

When both the left prediction mode (Left) and the upper prediction mode (Above) are non-directional modes, the MPM list may be composed of a total of four directional modes such as {V, H, V−4, V+4}, or it may be composed of four directional modes and a DC mode such as {V, H, V−4, V+4, DC} or {DC, V, H, V−4, V+4} (S1530). Here, V denotes a vertical mode (angular_50, directional mode No. 50), H a horizontal mode (angular_18, directional mode No. 18), V−4 a directional mode No. 46, and V+4 a directional mode No. 54.

When an addition or subtraction operator exists in a value of a prediction mode to be added to the MPM list, the MPM list may be provided with a result value obtained by applying the remainder operation as in Equation 1 below.

$$A' = A - 1 \rightarrow A' = 2 + ((A + 61) \% \ 64)$$
$$A' = A + 1 \rightarrow A' = 2 + ((A - 1) \% \ 64)$$
$$A' = A - 2 \rightarrow A' = 2 + ((A + 60) \% \ 64)$$
$$A' = A + 2 \rightarrow A' = 2 + ((A) \% \ 64)$$

Equation 1

An input value used for calculation may be designated by A, and A' is a result value included in the MPM list.

Additionally, when the value of the prediction mode to be added to the MPM list is out of a predetermined range (e.g., 2 or more to 66 or less), the result of applying the clipping function as in Equation 2 below may be included in the MPM list.

$$A' = A - 1 \rightarrow A' = \text{Clip}(\min{:}2, \max{:}66, (A-1))$$

Equation 2

In Step S1520, when at least one of the left prediction mode (Left) and the upper prediction mode (Above) is a directional mode, a determination may be mode on whether any one of the left prediction mode (Left) and the upper prediction mode (Above) is a non-directional mode, or whether both the left prediction mode (Left) and the upper prediction mode (Above) are directional modes while the left prediction mode (Left) and the upper prediction mode (Above) are identical to each other (S1550). To determine this, a step may be performed first for determining a maximum value and a minimum value between the left prediction mode (Left) and the upper prediction mode (Above) (S1520). Min=min(Left, Above) is the process of determining the minimum value between the left prediction mode (Left) and the upper prediction mode (Above), and Max=max(Left, Above) is the process of determining the maximum value between the left prediction mode (Left) and the upper prediction mode (Above).

When any one of the two modes is a non-directional mode (Min<=1), or when both modes are directional modes and the same (Min=Max), the MPM list may be configured as {Max, Max−1, Max+1, Max−2} including a total of four directional modes or as {Max, Max−1, Max+1, Max−2, DC} including four directional modes and a DC mode (S1560).

On the other hand, when the two modes are directional modes and different from each other, the MPM list may be configured as {Left, Above, Min+1, Max−1} including a total of four directional modes or as {Left, Above, Min+1, Max−1, DC} including four directional modes and a DC mode (S1570).

Embodiment 3-2

When the left prediction mode (Left) and the upper prediction mode (Above) are obtained (S1610), it can be determined whether both the left prediction mode (Left) and the upper prediction mode (Above) correspond to the non-directional mode (S1620).

When both the left prediction mode (Left) and the upper prediction mode (Above) are non-directional modes, the MPM list may be composed of a total of four directional modes such as {V, H, V−4, V+4} or composed of four directional modes and a DC mode such as {V, H, V−4, V+4, DC} (S1630).

When at least one of the left prediction mode (Left) and the upper prediction mode (Above) is a directional mode, it may be determined whether any one of the left prediction mode (Left) and the upper prediction mode (Above) is a non-directional mode (S1640). To determine this, a step may be performed first for determining the minimum value (Min) between the left prediction mode (Left) and the upper prediction mode (Above) (S1630).

When any one of the left prediction mode (Left) and the upper prediction mode (Above) is a non-directional mode (Min<=1), the MPM list may be composed of a total of four directional modes such as {Max, Max−1, Max+1, Max−2}, or it may be composed of four directional modes and a DC mode such as {Max, Max−1, Max+1, Max−2, DC} (S1650).

In Step S1640, when both the left prediction mode (Left) and the upper prediction mode (Above) are directional modes, it may be determined whether the two directional modes are identical to each other (S1660). When the left prediction mode (Left) and the upper prediction mode (Above) are directional modes and identical to each other (Min=Max), the MPM list may be composed of a total of four directional modes such as {Left, Left−1, Left+1, Left−2}, or it may be composed of four directional modes and a DC mode such as {Left, Left−1, Left+1, Left−2, DC} (S1670).

In Step S1660, when the left prediction mode (Left) and the upper prediction mode (Above) are different from each other, it may be determined whether a difference between the two modes is within a preset range (S1680). Here, the preset range may be 2 or more to 66 or less. when the difference between the left prediction mode (Left) and the upper prediction mode (Above) is 2 or more and 66 or less, the MPM list may be composed of a total of four directional modes such as {Left, Above, Max−1, Max+1}, or it may be composed of four directional modes and a DC mode such as {Left, Above, Max−1, Max+1, DC} (S1690). When the difference between the left prediction mode (Left) and the upper prediction mode (Above) is less than 2 or more than 66, the MPM list may be composed of a total of four directional modes such as {Left, Above, Max−2, Max+2}, or it may be composed of four directional modes and a DC mode such as {Left, Above, Max−2, Max+2, DC} (S1695).

Embodiment 4

Embodiment 4 is an example method for binarizing indexes of MPM modes (candidate intra prediction modes included in the MPM list) and indexes of non-MPM modes (candidate intra prediction modes included in the non-MPM list.

In the present disclosure, the indexes of MPM modes are encoded using a truncated rice method, and the indexes of non-MPM modes are encoded by using a truncated binary method.

When the MPM list is configured by including four MPM modes, the parameter values for the truncated rice method may be k=0, Max=3. When the MPM list is configured by including five MPM modes, the parameter values for the truncated rice method may be k=0, Max=4. However, in an embodiment that configures the MPM list by including five MPM modes, parameter values for the truncated rice method may also be k=0, Max=3. Here, the parameter value k may be referred to as cRiceParam, and Max may be referred to as cMax.

Examples of the above two binarization methods are shown in Table 6.

TABLE 6

| index | (MPM: 4)<br>(k = 0, Max = 3) | (MPM: 5)<br>(k = 0, Max = 4) |
|---|---|---|
| 0 | 0 | 0 |
| 1 | 10 | 10 |
| 2 | 110 | 110 |
| 3 | 111 | 1110 |
| 4 | — | 1111 |

As represented in Table 6, with the truncated rice method, the indexes of MPM modes may be expressed with at most 3 bits (configuring the MPM list with 4 MPM modes) or at most 4 bits (configuring the MPM list with 5 MPM modes).

The non-MPM list is composed of a total of 61 non-MPM modes, except for the planar mode and 5 MPM modes among the total of 67 intra prediction modes. When the non-MPM list is composed of a total of 61 non-MPM modes, the parameter value for the truncated binary method may be Max=60. Table 7 shows an example in which the indexes of a total of 61 non-MPM modes are expressed in a truncated binary method. In Table 7, Max may be cMax.

TABLE 7

| index | Max = 60, n = 59<br>(32 < n < 64, k = 5) |
|---|---|
| 0 | 00000 |
| 1 | 00001 |
| 2 | 00010 |
| 3 | 00011 |
| 4 | 00100 |
| 5 | 001010 |
| 6 | 001011 |
| 7 | 001100 |
| 8 | 001101 |
| ... | ... |
| 60 | 111111 |

As shown in Table 7, indexes of non-MPM modes may be expressed with 5 bits or 6 bits by using the truncated binary method. The index values of the non-MPM modes shown in Table 7 are reconstructed index values of 61 non-MPM modes excluding the planar mode and 5 MPM modes among the total of 67 intra prediction modes. In other words, index values of 61 non-MPM modes are reconstructed through a shifting operation. For example, when 5 MPM modes are configured as {1, 3, 10, 15, 23} with the planar mode and MPM modes being shifted in all intra prediction modes, the non-MPM list is configured as {2, 4, 5, 6, 7, 8, 9, 11, 12, 13, 14, 16, . . . , 22, 24, 25, . . . , 65, 66}. In this case, prediction mode No. 2 is set to index 0, prediction mode No. 4 is set to index 1, and prediction mode No. 5 is set to index 2.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for intra prediction of a current block of video data, the apparatus comprising at least one processor configured to:
   decode reference line information indicating one of a plurality of reference lines to be referenced by the current block;
   decode, depending on the reference line information, intra subpartition information indicating whether an intra-subpartition is applied to the current block, wherein the intra subpartition information is decoded when one of the plurality of reference lines indicated by the reference line information is a reference line adjacent to the current block;

decode, based on the reference line information indicating one of the plurality of reference lines, most probable mode (MPM) information indicating whether an intra-prediction mode of the current block is included in an MPM list, wherein the MPM information is decoded, regardless of whether the intra-subpartition is applied to the current block, when one of the plurality of reference lines indicated by the reference line information is the reference line adjacent to the current block;

decode, depending on the reference line information and the MPM information, planar information indicating whether the intra-prediction mode of the current block is a planar mode, wherein the planar information is decoded when the intra-prediction mode of the current block is included in the MPM list and when one of the plurality of reference lines indicated by the reference line information is the reference line adjacent to the current block;

derive the intra-prediction mode of the current block based at least in part on the planar information; and generate a prediction block corresponding to the current block based on the derived intra-prediction mode of the current block, wherein when the intra-subpartition is applied to the current block, the at least one processor is configured to generate the prediction block by:
dividing the current block into two or more subblocks; and
predicting the subblocks using the intra-prediction mode of the current block, respectively.

2. The apparatus of claim 1, wherein the at least one processor is, for deriving of the intra-prediction mode, further configured to:
set the planar mode as the intra-prediction mode of the current block when the planar information indicates the intra-prediction mode of the current block is the planar mode.

3. The apparatus of claim 1, wherein the at least one processor is, for deriving of the intra-prediction mode, further configured to:
set, as the intra-prediction mode of the current block, a candidate intra-prediction mode indicated by an MPM index in the MPM list when the planar information indicates the intra-prediction mode of the current block is not the planar mode.

4. The apparatus of claim 1, wherein the at least one processor is further configured to:
derive candidate intra-prediction modes from a left prediction mode that is a prediction mode of a block located leftward of the current block and an upper prediction mode that is a prediction mode of a block located upward of the current block, based on whether the left prediction mode and the upper prediction mode are identical to each other and whether one or both of the left prediction mode and the upper prediction mode are directional modes; and
configure the MPM list including the candidate intra-prediction modes.

5. The apparatus of claim 4, wherein the at least one processor is, for deriving of the candidate intra-prediction modes, further configured to:
derive, when the left prediction mode and the upper prediction mode are different directional modes, the candidate intra-prediction modes based on whether a difference between the left prediction mode and the upper prediction mode is within a preset range.

6. The apparatus of claim 4, wherein the at least one processor is, for deriving of the candidate intra-prediction modes, further configured to:
set a direct current (DC) mode as one of the candidate intra-prediction modes when the left prediction mode and the upper prediction mode are both non-directional modes.

7. The apparatus of claim 6, wherein the at least one processor is, for deriving of the candidate intra-prediction modes, further configured to:
further set directional modes corresponding mode numbers 50, 18, 46, and 54 as the candidate intra-prediction modes, when the left prediction mode and the upper prediction mode are both non-directional modes.

8. The apparatus of claim 4, wherein the at least one processor is, for deriving of the candidate intra-prediction modes, further configured to:
determine whether one or both of the left prediction mode and the upper prediction mode are unavailable; and
in response to determining that one or both of the left prediction mode and the upper prediction mode are unavailable, set the one or both of the left prediction mode and the upper prediction mode equal to the planar mode during the derivation of the candidate intra-prediction modes.

9. An apparatus for intra prediction of a current block of video data, the apparatus comprising at least one processor configured to:
determine an intra-prediction mode of the current block;
encode reference line information indicating one of a plurality of reference lines to be referenced by the current block;
encode, depending on the reference line information, intra subpartition information indicating whether an intra-subpartition is applied to the current block, wherein the intra subpartition information is encoded when one of the plurality of reference lines indicated by the reference line information is a reference line adjacent to the current block;
encode, depending on the reference line information, most probable mode (MPM) information indicating whether the intra-prediction mode of the current block is included in an MPM list, wherein the MPM information is encoded, regardless of whether the intra-subpartition is applied to the current block, when one of the plurality of reference lines indicated by the reference line information is the reference line adjacent to the current block;
encode, depending on the reference line information and the MPM information, planar information indicating whether the intra-prediction mode of the current block is a planar mode, wherein the planar information is encoded when the intra-prediction mode of the current block is included in the MPM list and when one of the plurality of reference lines indicated by the reference line information is the reference line adjacent to the current block; and
generate a prediction block corresponding to the current block based on determined intra-prediction mode of the current block,
wherein when the intra-subpartition is applied to the current block, the at least one processor is configured to generate the prediction block by:
dividing the current block into two or more subblocks; and
predicting the subblocks using the intra-prediction mode of the current block, respectively.

10. An apparatus for providing a video decoding device with video data, the apparatus comprising at least one processor configured to:
- encode the video data into a bitstream; and
- transmit the bitstream to the video decoding device, wherein the at least one processor is, for encoding of the video data, further configured to:
- determine an intra-prediction mode of a current block;
- encode reference line information indicating one of a plurality of reference lines to be referenced by the current block;
- encode, depending on the reference line information, intra subpartition information indicating whether an intra-subpartition is applied to the current block, wherein the intra subpartition information is encoded when one of the plurality of reference lines indicated by the reference line information is a reference line adjacent to the current block;
- encode, depending on the reference line information, most probable mode (MPM) information indicating whether the intra-prediction mode of the current block is included in an MPM list, wherein the MPM information is encoded, regardless of whether the intra-subpartition is applied to the current block, when one of the plurality of reference lines indicated by the reference line information is the reference line adjacent to the current block;
- encode, depending on the reference line information and the MPM information, planar information indicating whether the intra-prediction mode of the current block is a planar mode, wherein the planar information is encoded when the intra-prediction mode of the current block is included in the MPM list and when one of the plurality of reference lines indicated by the reference line information is the reference line adjacent to the current block; and
- generate a prediction block corresponding to the current block based on determined intra-prediction mode of the current block,
- wherein when the intra-subpartition is applied to the current block, the at least one processor is configured to generate the prediction block by:
  - dividing the current block into two or more subblocks; and
  - predicting the subblocks using the intra-prediction mode of the current block, respectively.

* * * * *